United States Patent
Raman et al.

(10) Patent No.: US 12,381,709 B2
(45) Date of Patent: Aug. 5, 2025

(54) SYSTEMS AND METHODS FOR FLOW CONFIGURATION SYNCING BETWEEN NETWORK INFRASTRUCTURE DEVICES

(71) Applicant: Pensando Systems Inc., Milpitas, CA (US)

(72) Inventors: Balakrishnan Raman, Fremont, CA (US); Dontula Venkata Ratnananda Ganesh, Dublin, CA (US); Krishna Doddapaneni, Cupertino, CA (US); Sarat Kamisetty, Fremont, CA (US); Akshaya Nadahalli, Bangalore (IN); Rathina Sabapathy Sabesan, Bengaluru (IN); Prabu Thayalan, Bangalore (IN); Arun Selvarajan, Cupertino, CA (US)

(73) Assignee: Pensando Systems Inc., Milpitas, CA (US)

( * ) Notice: Subject to any disclaimer, the term of this patent is extended or adjusted under 35 U.S.C. 154(b) by 226 days.

(21) Appl. No.: 18/092,851

(22) Filed: Jan. 3, 2023

(65) Prior Publication Data
US 2024/0223353 A1    Jul. 4, 2024

(51) Int. Cl.
*H04L 7/10* (2006.01)
*H04L 49/00* (2022.01)

(52) U.S. Cl.
CPC ............ *H04L 7/10* (2013.01); *H04L 49/3063* (2013.01)

(58) Field of Classification Search
CPC .......................... H04L 7/10; H04L 49/3063
See application file for complete search history.

(56) References Cited

U.S. PATENT DOCUMENTS

| | | |
|---|---|---|
| 6,331,984 B1 | 12/2001 | Luciani |
| 7,720,815 B1 | 5/2010 | Jagannathan |
| 9,639,589 B1 | 5/2017 | Theimer et al. |
| 2008/0239945 A1 | 10/2008 | Gregg |
| 2012/0093211 A1 | 4/2012 | Ogami et al. |
| 2014/0019602 A1 | 1/2014 | Murthy et al. |
| 2014/0122769 A1 | 5/2014 | Su et al. |
| 2014/0351395 A1 | 11/2014 | Murthy et al. |

(Continued)

OTHER PUBLICATIONS

Van Renesse, Robbert et al. "Chain Replication for Supporting High Throughput and Availability", 2004, 14 pgs.

(Continued)

*Primary Examiner* — Duc C Ho

(57) ABSTRACT

A networking device can use sync request packets to synchronize connection objects with a peer. Real or virtual flow misses occurring in the data plane while processing a network packet indicate that synchronization is needed. A virtual flow miss occurs when a data plane connection object is obsolete. A sync request packet containing connection metadata and the network packets is sent to the peer. The peer uses the connection metadata to create or update its version of the connection object then returns a sync ack packet that contains the network packet. Receiving a sync ack packet can indicate that the locally stored version of the connection object and the peer's version of the connection object are consistent. The network packet may be processed normally when the locally stored version of the connection object and the peer's version of the connection object are consistent.

20 Claims, 17 Drawing Sheets

(56) References Cited

U.S. PATENT DOCUMENTS

| | | | |
|---|---|---|---|
| 2015/0067229 | A1 | 3/2015 | Connor et al. |
| 2016/0380964 | A1 | 12/2016 | Kuo et al. |
| 2017/0054593 | A1 | 2/2017 | Borikar et al. |
| 2017/0149660 | A1 | 5/2017 | Shu |
| 2018/0034769 | A1 | 2/2018 | Modi et al. |
| 2018/0115586 | A1 | 4/2018 | Chou et al. |
| 2018/0309595 | A1 | 10/2018 | Ma |
| 2019/0036815 | A1 | 1/2019 | Kancherla et al. |
| 2020/0192848 | A1 | 6/2020 | Maroney et al. |
| 2020/0272920 | A1 | 8/2020 | Liu et al. |
| 2020/0382329 | A1 | 12/2020 | Yuan |
| 2021/0044570 | A1 | 2/2021 | Hsu Liu et al. |
| 2021/0099368 | A1 | 4/2021 | Chitalia et al. |
| 2021/0103507 | A1 | 4/2021 | Pfister et al. |
| 2022/0210086 | A1 | 6/2022 | Karczmarek et al. |
| 2022/0374379 | A1 | 11/2022 | Galles et al. |
| 2022/0377012 | A1 | 11/2022 | Doddapaneni et al. |
| 2022/0377013 | A1 | 11/2022 | Doddapaneni et al. |
| 2022/0377027 | A1* | 11/2022 | Gai ................ H04L 45/74 |

OTHER PUBLICATIONS

Terrace, Jeff et al. "Object Storage on CRAQ—High-throughput chain replication for read-mostly workloads", 2009, 16 pgs.
Xillybus, "Down to the TLP: How PCI express devices talk (Part I)", Nov. 13, 2012, 7 pgs.
Expether Consortium "Technology Deep Dive", https://expether.org/technology.html, retrieved Apr. 2, 2021, 4 pgs.
Silla, Federico, "GPU virtualization: from vGPU and MIG to rCUDA", HPC-AI 2020 UK Conference, (2020), 41 pgs.
Metz, J. "Let's Talk Fabrics", Jun. 27, 2018, 49 pgs.
PCI Express, "Base Specification Revision 3.1a", Dec. 7, 2015, 1075 pgs.
Minturn, Dave, "Under the Hood with NVMe over Fabrics", Dec. 15, 2015, 47 pgs.
NVM Express, "NVM Express™ over Fabrics, Revision 1.1", Oct. 22, 2019, 83 pgs.
NVM Express, "NVM Express™ Management Interface, Revision 1.1C", Feb. 2, 2021, 155 pgs.
PCI-SIG®, "Single Root I/O Virtualization and Sharing Specification, Revision 1.1", Jan. 20, 2010, 100 pgs.
European Search Report, EP 22174226, dated Sep. 19, 2022, 6 pgs.
Non-Final Office Action, U.S. Appl. No. 17/326,279; (Mar. 1, 2022), 50 pgs.
Partial European Search Report, EP 22174152, dated Sep. 8, 2022, 4 pgs.
European Written Opinion, EP 22174152, dated Sep. 8, 2022, 4 pgs.
Mahalingam, M. et al. "Virtual extensible Local Area Network (VXLAN): A Framework for Overlaying Virtualized Layer 2 Networks over Layer 3 Networks", Request for Comments: 7348, Aug. 2014, 22 pgs.

* cited by examiner

US 12,381,709 B2

SYSTEMS AND METHODS FOR FLOW CONFIGURATION SYNCING BETWEEN NETWORK INFRASTRUCTURE DEVICES

TECHNICAL FIELD

The embodiments relate to computer networks, local area networks, networking devices such a router, a switch, a network interface card (NIC), a smartNIC, and a distributed service card (DSC). The embodiments also relate to elements of networking devices such as an application specific integrated circuit (ASIC) or field programmable gate array (FPGA) implementing a packet processing pipeline circuit. The embodiments further relate to synchronizing connection objects that can be used for configuring a packet processing pipeline circuit implementing a packet processing pipeline such as a P4 packet processing pipeline.

BACKGROUND

Networking devices process network flows by receiving network packets and processing the network packets. The network packets are often processed by examining the packet's header data and applying rules such as routing rules, firewall rules, load balancing rules, etc. Packet processing can be performed by a packet processing pipeline such as a "P4" packet processing pipeline. The concept of a domain-specific language for programming protocol-independent packet processors, known simply as "P4," developed as a way to provide some flexibility at the data plane of a networking device. The P4 domain-specific language for programming the data plane of a networking device has been defined in the "$P4_{16}$ Language Specification," version 1.2.2, as published by the P4 Language Consortium on May 17, 2021. P4 (also referred to herein as the "P4 specification," the "P4 language," and the "P4 program") is designed to be implementable on a large variety of targets including switches, routers, programmable NICs, software switches, field programmable gate arrays (FPGAs), and application specific integrated circuits (ASICs). As described in the P4 specification, the primary abstractions provided by the P4 language relate to header types, parsers, tables, actions, match-action units, control flow, extern objects, user-defined metadata, and intrinsic metadata. Packet processing pipeline circuits can be considered to be central processing unit (CPU) offloads because they offload work from the CPUs and thereby free the CPUs to perform other tasks. Cryptographic transform circuits, compression circuits, and decompression circuits, are also examples of CPU offloads.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure as a prelude to the more detailed description that is presented later.

One aspect of the subject matter described in this disclosure can be implemented in a system. The system can include an ingress port that receives a network packet sent to a network destination, a memory storing a configuration object that includes a plurality of rules for processing a plurality of network flows, a central processing unit (CPU) that is configured to use the configuration object to create or update a connection object for processing a one of the network flows that includes the network packet, and a packet processing pipeline circuit that is configured to use the connection object to process the network packet, wherein a connection metadata is produced and the connection object is created or updated because the packet processing pipeline circuit determines that the connection object is nonexistent or is obsolete while processing the network packet, wherein a sync request packet that includes the network packet and the connection metadata for the one of the network flows is generated and sent to a peer, wherein a sync ack packet that includes the network packet and that is responsive to the sync request packet is received, wherein the network packet is unpacked from the sync ack packet and then processed by the packet processing pipeline circuit using the connection object.

Another aspect of the subject matter described in this disclosure can be implemented by a method. The method can include storing a configuration object that includes a plurality of rules for processing a plurality of network flows, receiving a network packet of one of the network flows, determining that a connection object that a packet processing pipeline uses to process the one of the network flows is nonexistent or is obsolete, using the configuration object to produce a connection metadata and to create or update the connection object because the connection object is nonexistent or is obsolete, producing a sync request packet that includes the network packet and the connection metadata, sending the sync request packet to a peer, receiving a sync ack packet that includes the network packet and that is responsive to the sync request packet, producing, by the packet processing pipeline, a processed packet by using the connection object to process the network packet after the network packet is unpacked from the sync ack packet, and sending the processed packet to a network destination.

Yet another aspect of the subject matter described in this disclosure can be implemented in a system. The system can include an ingress means for receiving a network packet of a network flow, a storage means for storing a configuration means that includes a plurality of rules for processing a plurality of network flows, a processing means that uses the configuration means to create or update a connection means, a pipeline means for producing a processed packet by using the connection means to process the network packet, a means for determining that the connection means is nonexistent or is obsolete, an updating means for updating the connection means to a new version because the connection means is nonexistent or obsolete, and a peer updating means for updating a peer connection means to the new version.

In some implementations of the methods and devices, the network packet has a packet header that includes a 5-tuple, the 5-tuple indicates a source internet protocol (IP) address, a destination IP address, a source port, a destination port, and a protocol, and the packet processing pipeline circuit uses the 5-tuple to identify the connection object. In some implementations of the methods and devices, the packet processing pipeline circuit uses the connection object to process the one of the network flows, and the packet processing pipeline circuit uses a second connection object to process a second one of the network flows. In some implementations of the methods and devices, the packet processing pipeline circuit uses the connection object to process a first one of the network flows, the packet processing pipeline circuit uses a second connection object to process a second one of the network flows, the connection object has an object configuration version number, and the second connection object has a different object configuration version number that is different from the object configuration version number. In some implementations of the methods and devices, the network packet is a layer 2 packet. In some implementations of the methods and devices, a second sync request packet is received from the peer, the second sync request packet includes a second network packet and a second connection metadata for the second network packet, the second connection metadata is used to create or update a second connection object that can be used for processing the second network packet, and a second sync ack packet that includes the second network packet is generated and sent to the peer.

In some implementations of the methods and devices, a second network packet of the one of the network flows is received by the ingress port before the sync ack packet is received, and sending the second network packet to the network destination is delayed until after the sync ack packet is received. In some implementations of the methods and devices, the second network packet is sent to the network destination after the sync ack packet is received because the packet processing pipeline circuit determines that the connection object is nonexistent or is obsolete in the peer. In some implementations of the methods and devices, a second network packet of the one of the network flows is received by the ingress port before the sync ack packet is received, and a second sync request packet that includes the second network packet is generated and sent to the peer. In some implementations of the methods and devices, the configuration object includes a configuration version number, the connection object includes an object configuration version number, and the connection object is obsolete because the object configuration version number is not equal to the configuration version number.

In some implementations of the methods and devices, the peer stores a second connection object for the network packet, and the sync ack packet indicates an object configuration version of the second connection object. In some implementations of the methods and devices, a configuration change is received, and the connection object for the one of the network flows is obsolete because the configuration object is updated based on the configuration change. In some implementations of the methods and devices, the packet processing pipeline circuit updates the connection object because the network packet indicates a connection state change, and a second sync packet is sent to the peer because the packet processing pipeline circuit updated the connection object.

In some implementations of the methods and devices, the method further includes receiving a second sync request packet that includes a second network packet and a second connection metadata for the second network packet, using the second connection metadata to create or update a second connection object, generating a second sync ack packet that includes the second network packet, and sending the second sync ack packet in response to the second sync request packet. In some implementations of the methods and devices, a second network packet of the one of the network flows is received before the sync ack packet is received, and sending the second network packet to the network destination is delayed until after the sync ack packet is received. In some implementations of the methods and devices, the method further includes receiving a configuration change, and updating the connection object based on the configuration change, wherein the connection object is obsolete because the configuration object is updated based on the configuration change. In some implementations of the methods and devices, a match-action processing stage of a packet processing pipeline circuit updates the connection object because the network packet indicates a connection state change, and a second sync packet is sent to the peer because the packet processing pipeline circuit updated the connection object. In some implementations of the methods and devices, the method further includes receiving, by the peer, the sync request packet, using the connection metadata in the sync request packet to create or update a version of the connection object in the peer, generating the sync ack packet, and sending the sync ack packet in response to the sync request packet.

These and other aspects will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

BRIEF DESCRIPTION OF THE DRAWINGS

Throughout the description, similar reference numbers may be used to identify similar elements.

DETAILED DESCRIPTION

Figure 1:
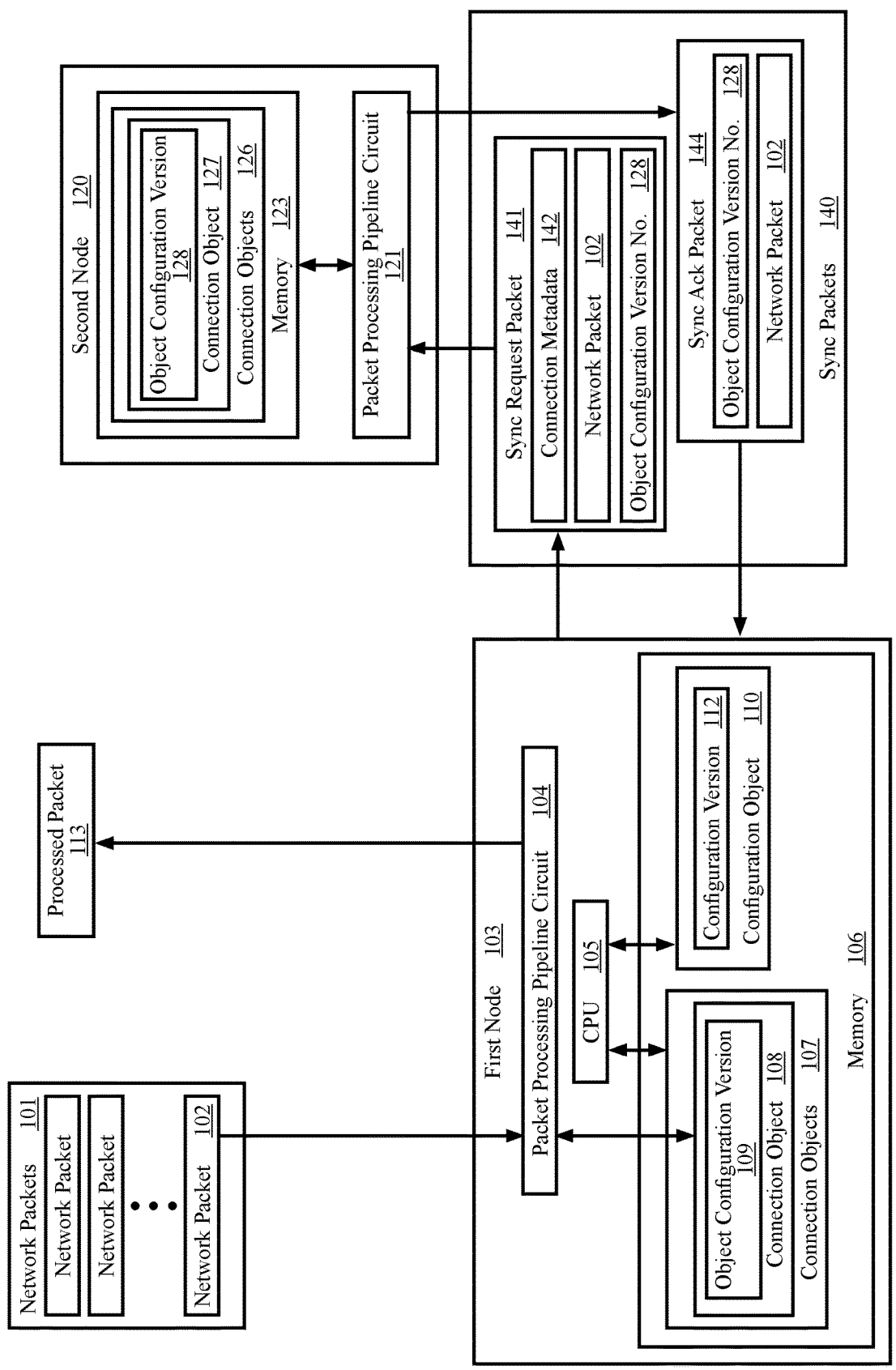
FIG. 1 is a high-level conceptual diagram illustrating flow configuration syncing between network infrastructure devices according to some aspects.

It will be readily understood that the components of the embodiments as generally described herein and illustrated in the appended figures could be arranged and designed in a wide variety of different configurations. Thus, the following more detailed description of various examples, as represented in the figures, is not intended to limit the scope of the present disclosure, but is merely representative of various embodiments. While the various aspects of the embodiments are presented in drawings, the drawings are not necessarily drawn to scale unless specifically indicated.

Systems and methods that implement aspects of the embodiments may have various differing forms. The described systems and methods are to be considered in all respects only as illustrative and not restrictive. The scope of the claims is, therefore, indicated by the claims themselves rather than by this detailed description. All changes which come within the meaning and range of equivalency of the claims are to be embraced within their scope.

Reference throughout this specification to features, advantages, or similar language does not imply that any system or method implements each and every aspect that may be realized. Rather, language referring to the features and advantages is understood to mean that a specific feature, advantage, or characteristic described in an example may be implemented in or by at least one embodiment. Thus, discussions of the features and advantages, and similar language, throughout this specification may, but do not necessarily, refer to the same embodiment.

Furthermore, the described features, advantages, characteristics, and aspects may be combined in any suitable manner in one or more systems or methods. One skilled in the relevant art will recognize, in light of the description herein, that an embodiment can be practiced without one or more of the specific features or advantages of another embodiment. In other instances, additional features and advantages may be recognized in certain embodiments that may not be present in all embodiments of the invention.

Reference throughout this specification to "one embodiment", "an embodiment", or similar language means that a particular feature, structure, or characteristic described in connection with the indicated embodiment is included in at least one embodiment. Thus, the phrases "in one embodiment", "in an embodiment", and similar language throughout this specification may, but do not necessarily, all refer to the same embodiment.

In the field of data networking, the functionality of networking devices such as switches, routers, and NICs are often described in terms of functionality that is associated with a "control plane" and functionality that is associated with a "data plane." In general, the control plane refers to components and/or operations that are involved in managing forwarding information and the data plane refers to components and/or operations that are involved in forwarding packets from an input interface to an output interface according to the forwarding information provided by the control plane. The data plane may also refer to components and/or operations that implement packet processing operations related to encryption, decryption, compression, decompression, firewalling, and telemetry.

Aspects described herein process packets using match-action pipelines. A match-action pipeline is a part of the data plane that can process network flows extremely quickly if the match-action pipeline is configured to process those network flows. A network flow can be a series of packets that are generated at a source and sent to a specific destination. Upon receiving a packet of a network flow, the match-action pipeline can generate an index from data in the packet header. Finding a flow table entry for the network flow at the index location in the flow table is the "match" portion of "match-action". If there is a "match", the "action" is performed to thereby process the packet. If there is no flow table entry for the network flow, it is a new network flow that the match-action pipeline is not yet configured to process. If there is no match, then the match-action pipeline can perform a default action.

The high-volume and rapid decision-making that occurs at the data plane is often implemented in one or more semiconductor chips. An application specific integrated circuit (ASIC) and a field programmable gate array (FPGA) are examples of such semiconductor chips. A semiconductor chip such as a fixed function ASIC may enable high-volume and rapid packet processing. However, a fixed function ASIC typically does not provide enough flexibility to adapt to changing needs. Data plane processing implemented in FPGAs may provide a high level of flexibility in data plane processing.

The data plane configurations of networking devices in data warehouses are constantly changing because the tenants of the data warehouse are actively modifying their networking infrastructure, connections change state, routes are adjusted, and other factors. The tenants' networking infrastructure includes virtual machines (VMs), storage, and networking elements that the tenants use to provide their services or to meet their internal needs. Tenants scale their infrastructure to meet fluctuating demands. As such, data warehouses are constantly provisioning VMs, destroying VMs, connecting VMs to storage, creating and deleting subnets in their networks, creating networking routes and network address translation (NAT) tables, etc. The networking devices within the data warehouse are therefore being rapidly updated with changes in their rules for routes, firewalls, NAT, etc. In high availability (HA) deployments, network devices are paired with one or more peer device such that a device's peer can take over when the device goes offline or other fails to perform its functions. An aspect of high availability peers is that the peer devices need to be synchronized such that a second peer device is capable of taking over the processing of network flows as if the first peer device is still operating. The speed at which networking rules, configurations, and, states change makes such synchronization costly and resource consumptive.

The synchronization issue can be addressed by synchronizing connection objects as needed such that network flows continue after one peer drops and the other takes over. A configuration object can indicate how a networking device is to process the network packets of network flows. The configuration object may change when a tenant changes its network infrastructure or when other events occur. A connection state can change when a session using a connection based protocol, such as transmission control protocol (TCP), changes state. Such connection state changes occur when a TCP connection is requested, brought up, torn down, etc. The connection state can be stored in a connection object. The control plane of a networking device can configure the data plane to process the network packets of network flows by adding connection objects to session tables, flow objects to flow tables, etc. Here, the term object is used in its most general sense to indicate a group of datums that may act as inputs and outputs to executable code such as the programs run by a central processing unit (CPU), a P4 pipeline stage, etc. For example, when a network packet for a new network flow arrives, the CPU can use the configuration object to determine the disposition (allow, drop, etc.) and rewriting (encapsulation, header rewrite, network address translation, etc.) for that new flow and can produce a connection object and/or flow objects that configure the data plane to process the new network flow. In some cases, such as when the state of a TCP session changes, the data plane can write the new connection state into the relevant connection object. The configuration object can have a configuration version number. The connection object can have an object configuration version number that indicates the configuration version number of the configuration object that was used to produce the connection object.

The connection object for a network flow can be synchronized across HA peers when a network packet is received for the network flow. The data plane will attempt to process the network packet but generates a flow miss if the data plane is not configured to process the network flow or generates a virtual flow miss if the connection object is obsolete. When a flow miss occurs (actual or virtual), the connection object is updated and a sync request packet informs the peer of the changed connection object. The network packet is not processed until after the peer acknowledges the sync request packet with a sync ack packet. As such, the connection objects in the HA peers are consistent for that network flow. An aspect of the sync request packet is that it can encapsulate the network packet. The sync ack packet can also encapsulate the network packet. As such, the network device does not need to store the network packet while waiting for the sync ack packet.

There are numerous advantages to using the sync and sync ack packets for ensuring the connection objects on the peers are consistent. One advantage is that the network packet does not need to be stored and tracked within the networking device while waiting for the sync ack packet. Another advantage is that the connection objects are synchronized for network flows and connections that are active and only when the relevant connection object changes. As such, the amount of synchronization information passed between the HA peers is reduced to only that information that is relevant for processing the currently active flows.

FIG. 1 is a high-level conceptual diagram illustrating flow configuration syncing between network infrastructure devices according to some aspects. The network infrastructure devices are a first node 103 and a second node 120 that are configured as HA peers. The first node has a memory 106 that stores connection objects 107 and a configuration object 110. The configuration object 110 indicates how network packets 101 are to be processed. The configuration object 110 can be used to produce the connection objects 107 that configure a packet processing pipeline circuit 104 in the first node 103 to process the network packets 101. A connection object 108 can be used to process the network packets that are part of a particular network flow. The connection object for a network flow may be nonexistent because no network packet for that flow has been received. After a connection object for a particular network flow is produced and stored, the data plane (e.g., the packet processing pipeline circuit) is configured to process the network packets of that network flow. The data plane (e.g., the packet processing pipeline circuit) uses the connection object to process the network packets of the network flow. Aspects of the connection object may be stored in various flow tables and other data structures within the data plane after the configuration object is used to configure the data plane. For example, the aspects of a connection object may include one or more flow objects such as a flow object for a forward flow and a flow object for a reverse flow. The forward flow can be the network flow network packets passing from a first machine to a second machine. The reverse flow can be the network flow passing from the second machine to the first machine. A connection, also called a session, can be the forward flow and the reverse flow. The connection object may therefore be used for processing the forward flow and the reverse flow.

The connection object 108 used by the packet processing pipeline circuit 104 for a particular network flow may be obsolete because the configuration object 110 has been updated to a new version. The packet processing pipeline circuit 104 can receive a network packet 102 for a network flow that is to be processed using connection object 108. The connection object 108 includes an object configuration version number 109. The packet processing pipeline can read the object configuration version number 109 of the connection object 108. The connection object 108 is obsolete if the configuration version 112 is not equal to the object configuration version number 109. If the connection object is not obsolete, the network packet can be processed normally because no synchronization with the second node 120 is needed. Otherwise, the CPU 105 can update the connection object 108 such that the data plane (e.g., packet processing pipeline circuit 104) is configured to process the network packet in accordance with the most recent version of the configuration object 110. Next, sync packets 140 are used to synchronize the connection object 127 in the second node 120 with the connection object 108 in the first node 103. The object configuration version can be stored in association with or as part of the connection object 108. The configuration version 112 can be stored in association with or as part of the connection object 110. As such, the object configuration version 109 is stored at a memory location that is different from the memory location where the configuration version 112 is stored.

The second node also has a memory 123 that stores connection objects 126 and that may store a configuration object. The first node 103 can produce a sync request packet 141 that can include connection metadata 142, the object configuration version number 128, and the network packet 102. By including the network packet 102, the sync request packet 141 encapsulates the network packet. The second node 120 receives the sync request packet 141 and uses the connection metadata 142 to create or update a connection object 127 for the network flow that includes the network packet 102. The connection object 127 may be created when, for example, the network packet 102 is the first network packet of the network flow. In such a case, the connection object 108 in the first node 103 and the connection object 127 in the second node 120 are created because the first packet of a new flow is received. Both connection objects 108, 127 can have the same object configuration version number 109, 128 because the object configuration version number is in the sync request packet 141. The connection metadata 142 may be produced by serializing the connection object 108 in the first node 103. The second node produces a sync ack packet 144 after the connection object 127 in the second node 120 is created or updated. The sync ack packet 144 includes the network packet 102 and object configuration version number 128 of the connection object in the peer. The peer is the second node 120.

The connection objects 108, 127 being now synchronized, the network packet 102 is processed. The network packet 102 can be taken from the sync ack packet 144 then passed to the packet processing pipeline circuit 104. The packet processing pipeline circuit 104 may process the network packet 102 normally, unless the connection object 108 has again been updated. Here, processed normally means data plane processing that does not include a flow miss or a virtual flow miss. If the first node 103 goes off line, then the second node 120 may process packets for the connection because the data plane of the second node 120 is configured to process those packets.

Figure 2:
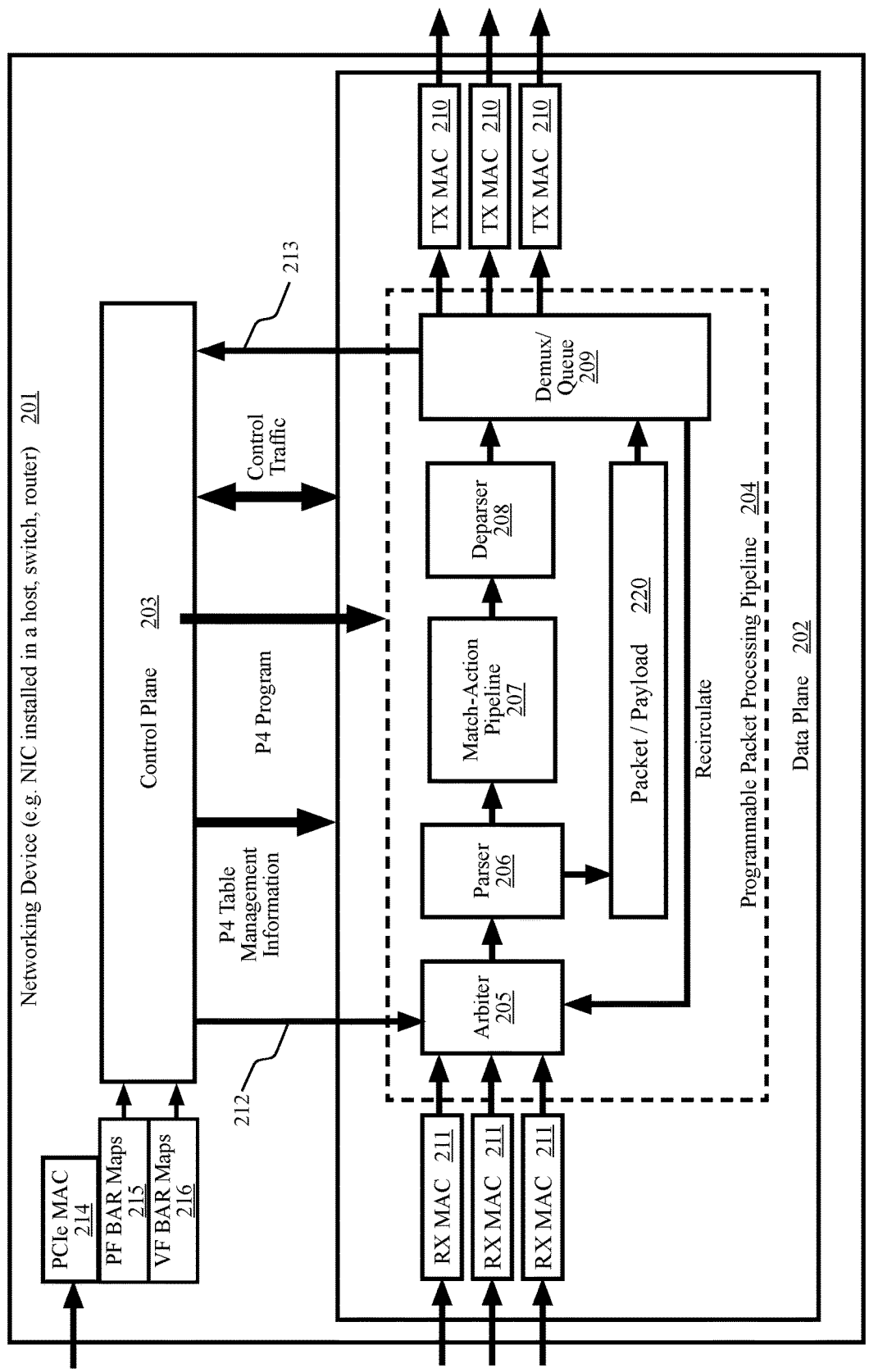
FIG. 2 is a functional block diagram of a networking device having a control plane and a data plane and in which aspects may be implemented.

FIG. 2 is a functional block diagram of a networking device having a control plane and a data plane and in which aspects may be implemented. A networking device 201 can have a control plane 203 and a data plane 202. The control plane provides forwarding information (e.g., in the form of table management information or configuration data) to the data plane and the data plane receives packets on input interfaces, processes the received packets, and then forwards packets to desired output interfaces. Additionally, control traffic (e.g., in the form of packets) may be communicated from the data plane to the control plane and/or from the control plane to the data plane. The data plane and control plane are sometimes referred to as the "fast" plane and the "slow" plane, respectively. In general, the control plane is responsible for less frequent and less time-sensitive operations such as updating Forwarding Information Bases (FIBs) and Label Forwarding Information Bases (LFIBs), while the data plane is responsible for a high volume of time-sensitive forwarding decisions that need to be made at a rapid pace. The control plane may implement operations related to packet routing that include InfiniBand channel adapter management functions, Open Shortest Path First (OSPF), Enhanced Interior Gateway Routing Protocol (EIGRP), Border Gateway Protocol (BGP), Intermediate System to Intermediate System (IS-IS), Label Distribution Protocol (LDP), routing tables and/or operations related to packet switching that include Address Resolution Protocol (ARP) and Spanning Tree Protocol (STP). The data plane (which may also be referred to as the "forwarding" plane) may implement operations related to parsing packet headers, Quality of Service (QOS), filtering, encapsulation, queuing, and policing. Although some functions of the control plane and data plane are described, other functions may be implemented in the control plane and/or the data plane.

Some techniques exist for providing flexibility at the data plane of networking devices that are used in data networks. For example, the concept of a domain-specific language for programming protocol-independent packet processors, known simply as "P4," has developed as a way to provide some flexibility at the data plane of a networking device. The document "$P4_{16}$ Language Specification," version 1.2.2, published by the P4 Language Consortium on May 17, 2021, which is incorporated by reference herein, describes the P4 domain-specific language that can be used for programming the data plane of a networking device. P4 (also referred to herein as the "P4 specification," the "P4 language," and the "P4 program") is designed to be implementable on a large variety of targets including switches, routers, programmable NICs, software switches, FPGAs, and ASICs. As described in the P4 specification, the primary abstractions provided by the P4 language relate to header types, parsers, tables, actions, match-action units, match-action pipeline stages, control flow, extern objects, user-defined metadata, and intrinsic metadata.

The data plane 202 includes multiple receive (RX) media access controllers (MACs) 211 and multiple transmit (TX) MACs 210. The RX MACs 211 implement media access control on incoming packets via, for example, a layer 2 protocol such as Ethernet. The layer 2 protocol can be Ethernet and the RX MACs can be configured to implement operations related to, for example, receiving frames, half-duplex retransmission and back-off functions, Frame Check Sequence (FCS), interframe gap enforcement, discarding malformed frames, and removing the preamble, Start Frame Delimiter (SFD), and padding from a packet. Likewise, the TX MACs 210 implement media access control on outgoing packets via, for example, Ethernet. The TX MACs can be configured to implement operations related to, for example, transmitting frames, half-duplex retransmission and back-off functions, appending an FCS, interframe gap enforcement, and prepending a preamble, an SFD, and padding.

As illustrated in FIG. 2, a P4 program is provided to the data plane 202 via the control plane 203. Communications between the control plane and the data plane can use a dedicated channel or bus, can use shared memory, etc. The P4 program includes software code that configures the functionality of the data plane 202 to implement particular processing and/or forwarding logic and to implement processing and/or forwarding tables that are populated and managed via P4 table management information that is provided to the data plane from the control plane. Control traffic (e.g., in the form of packets) may be communicated from the data plane to the control plane and/or from the control plane to the data plane. In the context of P4, the control plane corresponds to a class of algorithms and the corresponding input and output data that are concerned with the provisioning and configuration of the data plane corresponds to a class of algorithms that describe transformations on packets by packet processing systems.

The data plane 202 includes a programmable packet processing pipeline 204 that is programmable using a domain-specific language such as P4 and that can be used to implement the programmable packet processing pipeline 204. As described in the P4 specification, a programmable packet processing pipeline can include an arbiter 205, a parser 206, a match-action pipeline 207, a deparser 208, and a demux/queue 209. The data plane elements described may be implemented as a P4 programmable switch architecture, as a P4 programmable NIC, as a P4 programmable router, or some other architecture. The arbiter 205 can act as an ingress unit receiving packets from RX MACs 211 and can also receive packets from the control plane via a control plane packet input 212. The arbiter 205 can also receive packets that are recirculated to it by the demux/queue 209. The demux/queue 209 can act as an egress unit and can also be configured to send packets to a drop port (the packets thereby disappear), to the arbiter via recirculation, and to the control plane 203 via an output central processing unit (CPU) port 213. The control plane is often referred to as a CPU although, in practice, control planes often include multiple CPU cores and other elements. The arbiter 205 and the demux/queue 209 can be configured through the domain-specific language (e.g., P4).

The parser 206 is a programmable element that can be configured through the domain-specific language (e.g., P4) to extract information from a packet (e.g., information from the header of the packet). As described in the P4 specification, parsers describe the permitted sequences of headers within received packets, how to identify those header sequences, and the headers and fields to extract from packets. The information extracted from a packet by the parser can be referred to as a packet header vector (PHV). The parser can identify certain fields of the header and can extract the data corresponding to the identified fields to generate the PHV. The PHV may include other data (often referred to as "metadata") that is related to the packet but not extracted directly from the header, including for example, the port or interface on which the packet arrived at the networking device. Thus, the PHV may include other packet related data (metadata) such as input/output port number, input/output interface, or other data in addition to information extracted directly from the packet header. The PHV produced by the parser may have any size or length. For example, the PHV may be at least 4 bits, 8 bits, 16 bits, 32 bits, 64 bits, 128 bits, 256 bits, or 512 bits. In some cases, a PHV having even more bits (e.g., 6 Kb) may include all relevant header fields and metadata corresponding to a received packet. The size or length of a PHV corresponding to a packet may vary as the packet passes through the match-action pipeline.

The deparser 208 is a programmable element that is configured through the domain-specific language (e.g., P4) to generate packet headers from PHVs at the output of match-action pipeline 207 and to construct outgoing packets by reassembling the header(s) such as Ethernet headers, internet protocol (IP) headers, InfiniBand protocol data units (PDUs), etc. as determined by the match-action pipeline. In some cases, a packet/payload may travel in a separate queue or buffer 220, such as a first-in-first-out (FIFO) queue, until the packet payload is reassembled with its corresponding PHV at the deparser to form a packet. The deparser may rewrite the original packet according to the PHV fields that have been modified (e.g., added, removed, or updated). In some cases, a packet processed by the parser may be placed in a packet buffer/traffic manager for scheduling and possible replication. In some cases, once a packet is scheduled and leaves the packet buffer/traffic manager, the packet may be parsed again to generate an egress PHV. The egress PHV may be passed through a match-action pipeline after which a final deparser operation may be executed (e.g., at deparser 208) before the demux/queue 209 sends the packet to the TX MAC 210 or recirculates it back to the arbiter 205 for additional processing.

A networking device 201 can have a peripheral component interconnect extended (PCIe) interface such as PCIe media access control (MAC) 214. A PCIe MAC can have a base address register (BAR) at a base address in a host system's memory space. Processes, typically device drivers within the host system's operating system, can communicate with a NIC via a set of registers beginning with the BAR. Some PCIe devices are single root input output virtualization (SR-IOV) capable. Such PCIe devices can have a physical function (PF) and a virtual function (VF). A PCIe SR-IOV capable device may have multiple VFs. A PF BAR map 215 can be used by the host machine to communicate with the PCIe card. A VF BAR map 216 can be used by a virtual machine (VM) running on the host to communicate with the PCIe card. Typically, the VM can access the NIC using a device driver within the VM and at a memory address within the VMs memory space. Many SR-IOV capable PCIe cards can map that location in the VM's memory space to a VF BAR. As such a VM may be configured as if it has its own NIC while in reality it is associated with a VF provided by a SR-IOV capable NIC. As discussed below, some PCIe devices can have multiple PFs. For example, a NIC can provide network connectivity via one PF and can provide an InfiniBand channel adapter via another PF. As such, the NIC can provide "NIC" VFs and "InfiniBand" VFs to VMs running on the host. The InfiniBand PF and VFs can be used for data transfers, such as remote direct memory access (RDMA) transfers to other VMs running on the same or other host computers. Similarly, a NIC can provide non-volatile memory express (NVMe) and small computer system interface (SCSI) PFs and VFs to VMs running on the host.

Figure 3:
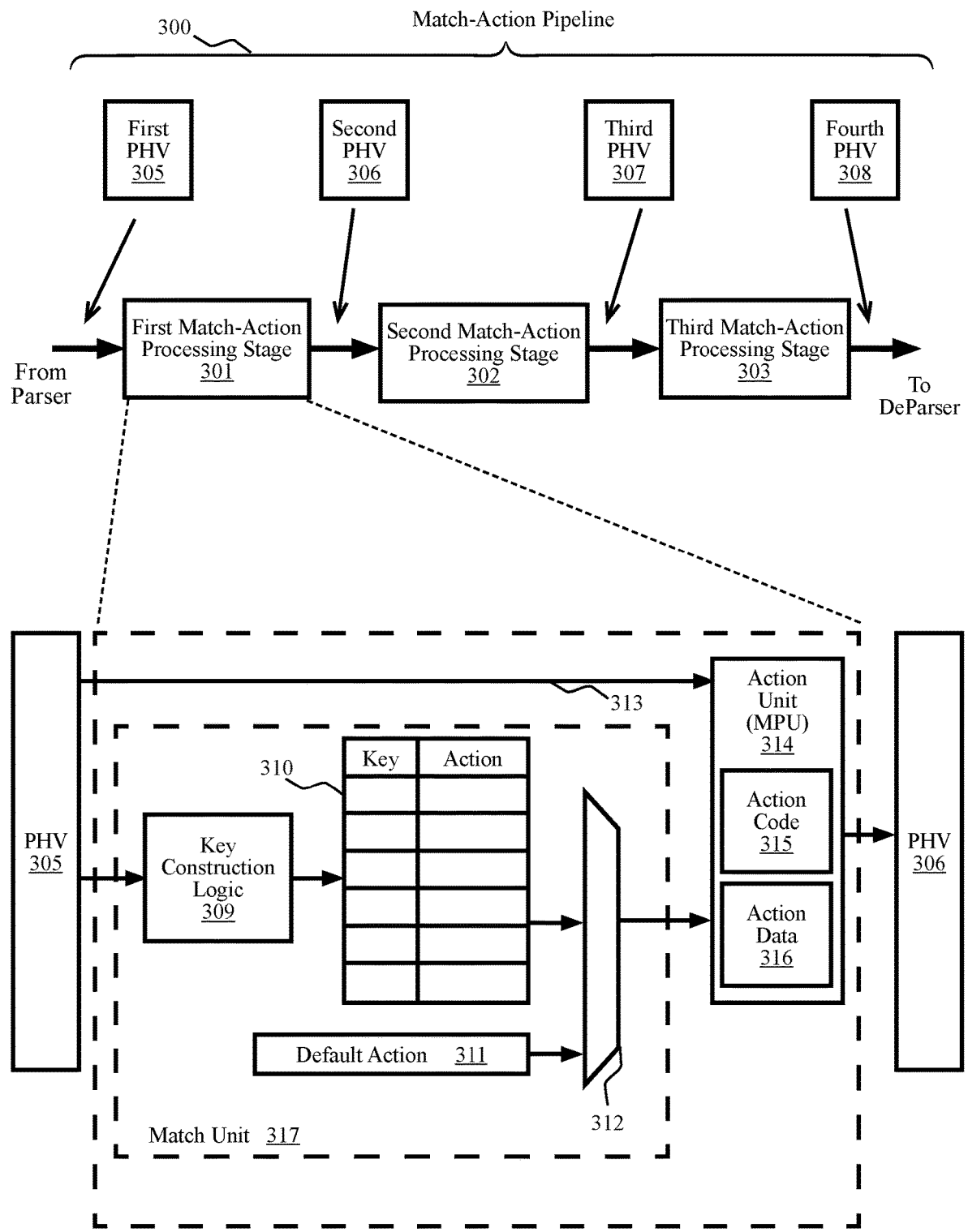
FIG. 3 is a functional block diagram illustrating an example of a match-action processing stage in a match-action pipeline according to some aspects.

FIG. 3 is a functional block diagram illustrating an example of a match-action unit 301 in a match-action pipeline 300 according to some aspects. FIG. 3 introduces certain concepts related to match-action units and match-action pipelines and is not intended to be limiting. The match-action units are processing stages, often match-action processing stages, of the packet processing pipeline. The match-action processing stages 301, 302, 303 of the match-action pipeline 300 are programmed to perform "match-action" operations in which a match unit performs a lookup using at least a portion of the PHV and an action unit performs an action based on an output from the match unit. A PHV generated at the parser may be passed through each of the match-action processing stages in the match-action pipeline in series and each match-action processing stages can implement a match-action operation or policy. The PHV and/or table entries may be updated in each match-action processing stage according to the actions specified by the P4 programming. In some instances, a packet may be recirculated through the match-action pipeline, or a portion thereof, for additional processing. The first match-action processing stage 301 receives the first PHV 305 as an input and outputs the second PHV 306. The second match-action processing stage 302 receives the second PHV 306 as an input and outputs the third PHV 307. The third match-action processing stage 303 receives the third PHV 307 as an input and outputs the fourth PHV 308.

An expanded view of elements of a match-action processing stage 301 of match-action pipeline 300 is shown. The match-action processing stage includes a match unit 317

(also referred to as a "table engine") that operates on an input PHV 305 and an action unit 314 that produces an output PHV 306, which may be a modified version of the input PHV 305. The match unit 317 can include key construction logic 309, a lookup table 310, and selector logic 312. The key construction logic 309 is configured to generate a key from at least one field in the PHV (e.g., 5-tuple, InfiniBand queue pair identifiers, etc.). The lookup table 310 is populated with key-action pairs, where a key-action pair can include a key (e.g., a lookup key) and corresponding action code 315 and/or action data 316. A P4 lookup table may be viewed as a generalization of traditional switch tables, and can be programmed to implement, for example, routing tables, flow lookup tables, access control lists (ACLs), and other user-defined table types, including complex multi-variable tables. The key generation and lookup functions constitute the "match" portion of the operation and produce an action that is provided to the action unit via the selector logic. The action unit executes an action over the input data (which may include data 313 from the PHV) and provides an output that forms at least a portion of the output PHV. For example, the action unit executes action code 315 on action data 316 and PHV data 313 to produce an output that is included in the output PHV 306. If no match is found in the lookup table, then a default action 311 may be implemented. A flow miss is an example of a default action that may be executed when no match is found. The operations of the match-action processing stages can be programmable by the control plane via P4 and the contents of the lookup table can be managed by the control plane.

Figure 4:
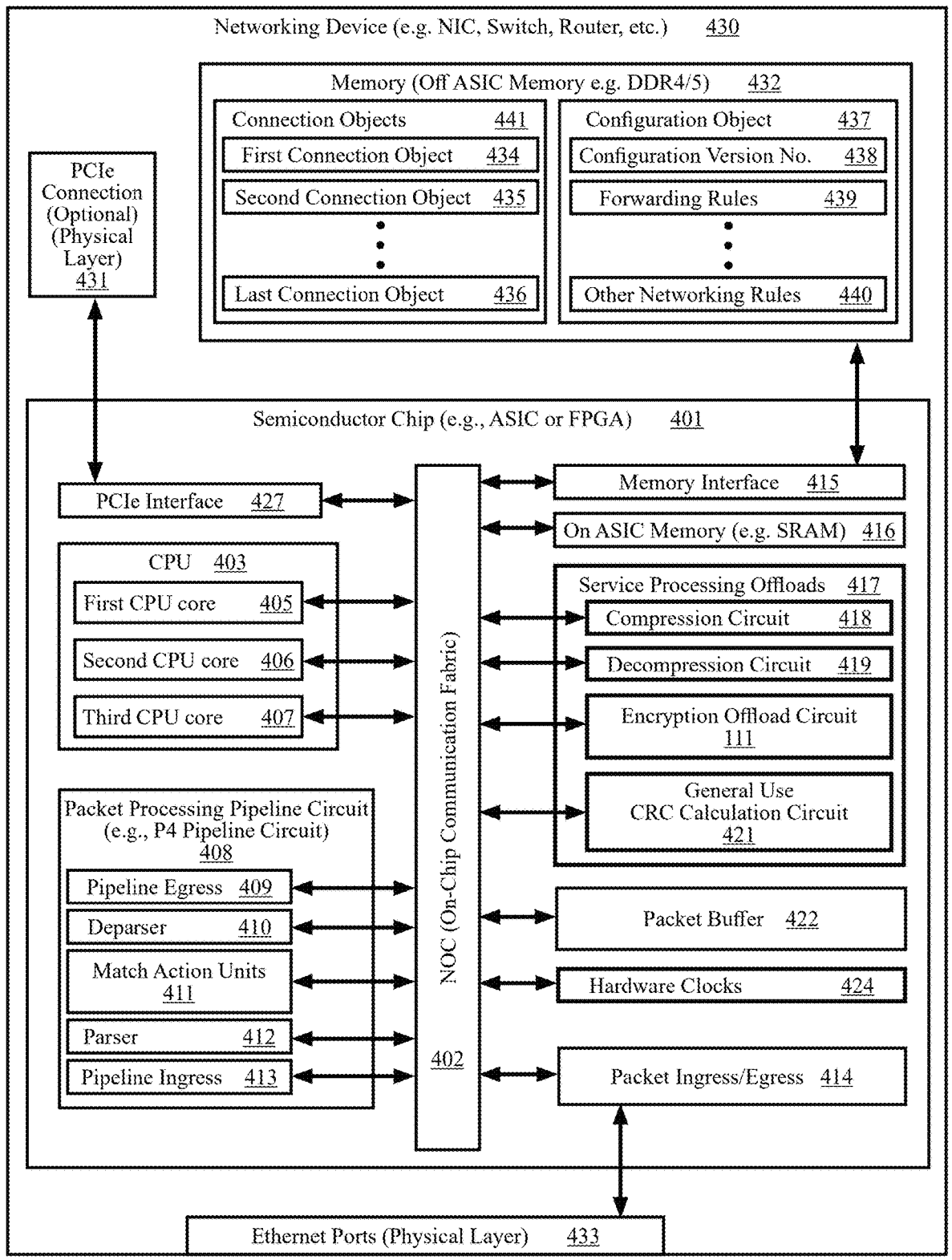
FIG. 4 is a functional block diagram of a networking device having a semiconductor chip such as an ASIC or FPGA, according to some aspects.

FIG. 4 is a functional block diagram of a networking device 430 having a semiconductor chip 401 such as an ASIC or FPGA, according to some aspects. The semiconductor chip 401 is shown implementing a large number of hardware functions. A different and substantially equivalent implementation may employ a chiplet architecture. If the networking device is a network interface card (NIC) then the NIC can be installed in a host computer and can act as a networking device for the host computer and for virtual machines running on the host computer. Such a NIC can have a PCIe connection 431 for communicating with the host computer via a host PCIe connection. The networking device 430 can have a semiconductor chip 401 performing networking operations, memory 432, and ethernet ports 433. The memory 432 can be one of the widely available memory modules or chips such as double data rate 5 (DDR5) synchronous dynamic random-access memory (SDRAM) such that the semiconductor chip has access to many gigabytes of memory on the networking device 430. The ethernet ports 433 provide physical connectivity to a computer network such as the internet. The NIC can include a printed circuit board to which the semiconductor chip 401 and the memory 432 are attached.

The semiconductor chip 401 can have many core circuits interconnected by an on-chip communications fabric, sometimes called a network on a chip (NOC) 402. A NOC is often an implementation of a standardized communications fabric such as the widely used advanced extensible interface (AXI) bus. The semiconductor chip's core circuits can include a PCIe interface 427, CPU 403, P4 packet processing pipeline 408 elements, memory interface circuit 415, on-chip memory such as static random access memory (SRAM) 416, service processing offloads 417, a packet buffer 422, and packet ingress/egress circuits 414. The PCIe interface 427 can be used to communicate with a host computer via the PCIe connection 431. The PCIe interface 427 can be an ingress/egress port for network traffic that passes to and from the host computer. The CPU 403 can include numerous CPU cores such as a first CPU core 405, a second CPU core 406, and a third CPU core 407. The P4 packet processing pipeline circuit 408 can include a pipeline ingress circuit 413, a parser circuit 412, match-action processing stages 411, a deparser circuit 410, and a pipeline egress circuit 409. The service processing offloads 417 are circuits implementing functions that the semiconductor chip uses so often that the designer has chosen to provide hardware for offloading those functions from the CPUs. The service processing offloads can include a compression circuit 418, decompression circuit 419, an encryption offload circuit 111, and a general use CRC calculation circuit 421. The encryption offload circuit 111 can encrypt a data block and produce a digest value for that encrypted block using a single read of the data block from the memory 432. The general use CRC calculation circuit 421 can calculate digest values for data blocks. For example, the general use CRC calculation circuit 421 can calculate Ethernet FCS values. The specific core circuits implemented within the non-limiting example of semiconductor chip 401 can be selected such that the semiconductor chip implements many, perhaps all, of the functionality of an InfiniBand channel adapter, of an NVMe card, and of a networking device that processes network flows carried by internet protocol (IP) packets.

A network device can include precision clocks that output a precise time, clocks that are synchronized to remote authoritative clocks via precision time protocol (PTP), and hardware clocks 424. A hardware clock may provide a time value (e.g., year/day/hour/minute/second/ . . . ) or may simply be a counter that is incremented by one at regular intervals (e.g., once per clock cycle for a device having a 10 nsec. clock period). Time values obtained from the clocks can be used as timestamps for events such as enqueuing/dequeuing a packet.

The packet processing pipeline circuit 408 is a specialized set of elements for processing network packets such as internet protocol (IP) packets and InfiniBand protocol data units (PDUs). The packet processing pipeline circuit 408 can be a P4 packet processing pipeline circuit that implements a P4 pipeline that can be configured using a domain-specific language such as the P4 domain specific language. As described in the P4 specification, the primary abstractions provided by the P4 language relate to header types, parsers, tables, actions, match-action units, control flow, extern objects, user-defined metadata, and intrinsic metadata.

The networking device 430 can include a memory 432 for running Linux or some other operating system and for storing data used by the processes implementing network services, upgrading the control plane, and upgrading the data plane. The networking device can use the memory 432 to store connection objects 441 and the configuration objects 437. The connection objects 441 can include a first connection object 434, a second connection object 435, and a last connection object 436. The configuration objects 437 can include a configuration version number 438, forwarding rules 439, and other networking rules 440.

The CPU cores 405, 406, 407 can be general purpose processor cores, such as ARM processor cores, and/or x86 processor cores, as is known in the field. Each CPU core can include an arithmetic logic unit (ALU), a register bank, an instruction fetch unit, and an instruction decoder, which are configured to execute instructions independently of the other CPU cores. The CPU cores may be Reduced Instruction Set Computers (RISC) CPU cores that are programmable using a general-purpose programming language such as C.

The CPU cores 405, 406, 407 can also include a bus interface, internal memory, and a memory management unit (MMU) and/or memory protection unit. For example, the CPU cores may include internal cache, e.g., L1 cache and/or L2 cache, and/or may have access to nearby L2 and/or L3 cache. Each CPU core may include core-specific L1 cache, including instruction-cache and data-cache and L2 cache that is specific to each CPU core or shared amongst a small number of CPU cores. L3 cache may also be available to the CPU cores.

There may be multiple CPU cores 405, 406, 407 available for control plane functions and for implementing aspects of a slow data path that includes software implemented packet processing functions. The CPU cores may be used to implement discrete packet processing operations such as L7 applications (e.g., HTTP load balancing, L7 firewalling, and/or L7 telemetry), certain InfiniBand channel adapter functions, flow table insertion or table management events, connection setup/management, multicast group join, deep packet inspection (DPI) (e.g., URL inspection), storage volume management (e.g., NVMe volume setup and/or management), encryption, decryption, compression, and decompression, which may not be readily implementable through a domain-specific language such as P4, in a manner that provides fast path performance as is expected of data plane processing.

The packet buffer 422 can act as a central on-chip packet switch that delivers packets from the network interfaces 433 to packet processing elements of the data plane and vice-versa. The packet processing elements can include a slow data path implemented in software and a fast data path implemented by the packet processing pipeline circuit 408.

The packet processing pipeline circuit 408 can be a specialized circuit or part of a specialized circuit using one or more ASICs or FPGAs to implement programmable packet processing pipelines such as the programmable packet processing pipeline 204 of FIG. 2. Some embodiments include ASICs or FPGAs implementing a P4 pipeline as a fast data path within the networking device. The fast data path is called the fast data path because it processes packets faster than a slow data path that can also be implemented within the networking device. An example of a slow data path is a software implemented data path wherein the CPU 403 and memory 432 are configured via software to implement a slow data path.

All memory transactions in the networking device 430, including host memory transactions, on board memory transactions, and register reads/writes may be performed via a coherent interconnect 402. In one non-limiting example, the coherent interconnect can be provided by a network on a chip (NOC) "IP core". Semiconductor chip designers may license and use prequalified IP cores within their designs. Prequalified IP cores may be available from third parties for inclusion in chips produced using certain semiconductor fabrication processes. A number of vendors provide NOC IP cores. The NOC may provide cache coherent interconnect between the NOC masters, including the packet processing pipeline circuit 408, CPU cores 405, 406, 407, memory interface circuit 415, and PCIe interface 427. The interconnect may distribute memory transactions across a plurality of memory interfaces using a programmable hash algorithm. All traffic targeting the memory may be stored in a NOC cache (e.g., 1 MB cache). The NOC cache may be kept coherent with the CPU core caches.

Figure 5:
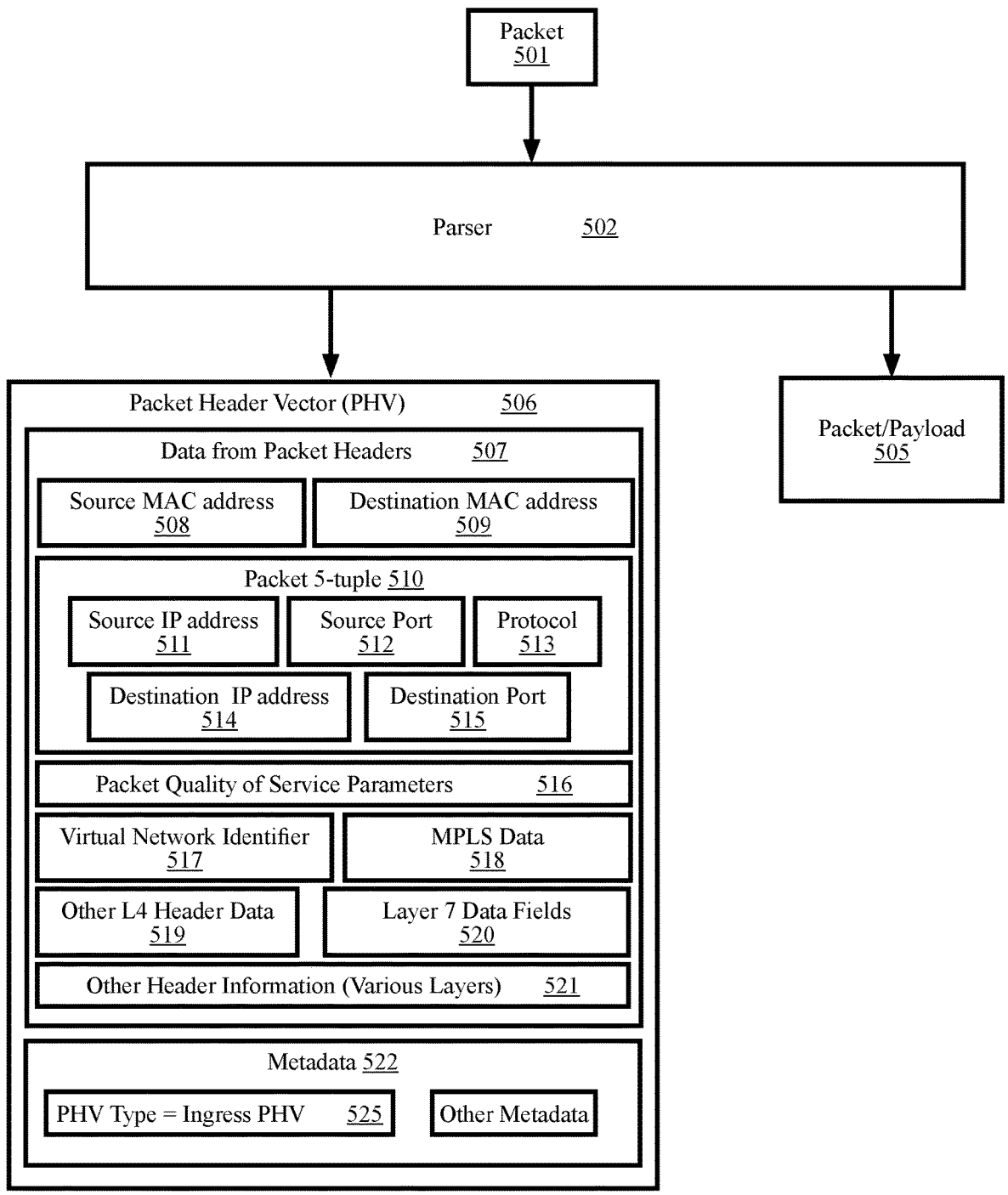
FIG. 5 is a high-level diagram illustrating an example of generating a packet header vector from a packet according to some aspects.

FIG. 5 is a high-level diagram illustrating an example of generating a packet header vector 506 from a packet 501 according to some aspects. The parser 502 can receive a packet 501 that has layer 2, layer 3, layer 4, and layer 7 headers and payloads. The parser can generate a packet header vector (PHV) from packet 501. The packet header vector 506 can include many data fields including data from packet headers 507 and metadata 522. The metadata 522 can include data generated by the networking device such as the hardware port on which the packet 501 was received and the packet timestamps indicating when the packet 501 was received by the networking device, enqueued, dequeued, etc. The metadata 522 can also include data produced by the networking device while processing a packet or assembling a packet. The metadata 522 can include a PHV type field 525 indicating that the PHV is an ingress PHV as well as other metadata. The source MAC address 508 and the destination MAC address 509 can be obtained from the packet's layer 2 header. The source IP address 511 can be obtained from the packet's layer 3 header. The source port 512 can be obtained from the packet's layer 4 header. The protocol 513 can be obtained from the packet's layer 3 header. The destination IP address 514 can be obtained from the packet's layer 3 header. The destination port 515 can be obtained from the packet's layer 4 header. The packet quality of service parameters 516 can be obtained from the packet's layer 3 header or another header based on implementation specific details. The layer 4 header data 517 may be obtained from the packet's layer 4 header. The multi-protocol label switching (MPLS) data 518, such as an MPLS label, may be obtained from the packet's layer 2 header. The layer 7 header data 519 can be obtained from the packet's layer 7 header. The other layer 7 data fields 520 can be obtained from the packet's layer 7 payload. The other header information 521 is the other information contained in the packet's layer 2, layer 3, layer 4, and layer 7 headers.

The packet 5-tuple 510 is often used for generating keys for match tables. The packet 5-tuple 510 can indicate the source IP address 511, the source port 512, the protocol 513, the destination IP address 514, and the destination port 515. A networking device can use the 5-tuple to identify a network flow because all of the network packets in the network flow can have the same 5-tuple.

Those practiced in computer networking protocols realize that the headers carry much more information than that described here, realize that substantially all of the headers are standardized by documents detailing header contents and fields, and know how to obtain those documents. The parser can also be configured to output a packet or payload 505. Recalling that the parser 502 can be a programmable element that is configured through the domain-specific language (e.g., P4) to extract information from a packet, the specific contents of the packet or payload 505 are those contents specified via the domain specific language. For example, the contents of the packet or payload 505 can be the layer 3 payload.

Figure 6:
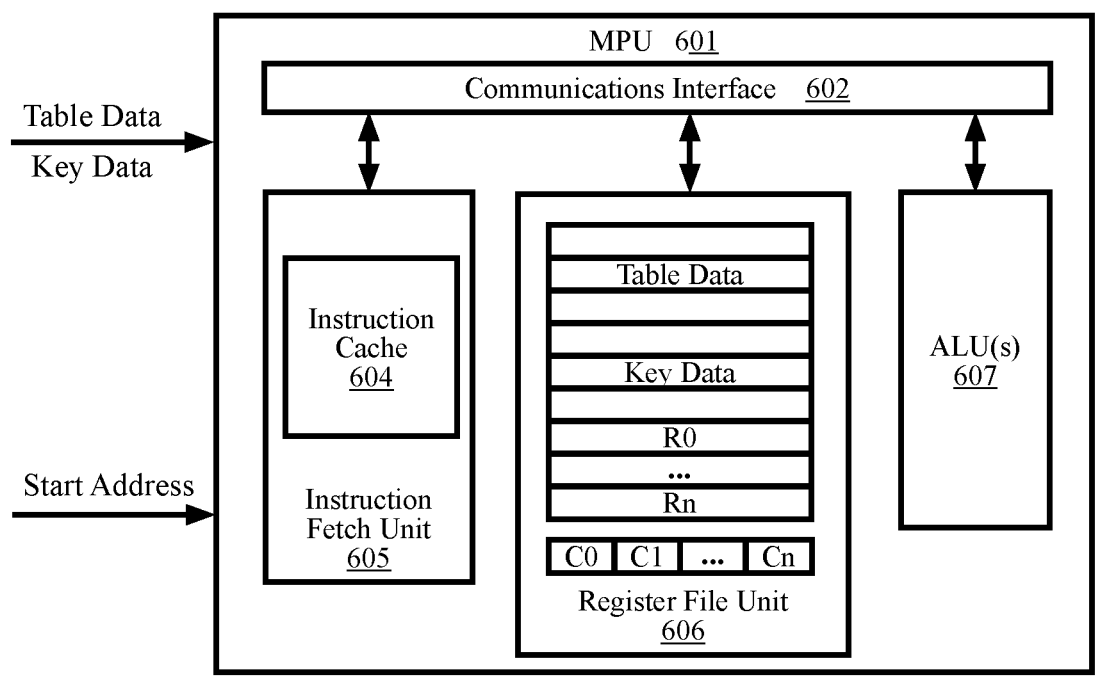
FIG. 6 illustrates a block diagram of a match processing unit (MPU) that may be used within the exemplary system of FIG. 4 to implement some aspects.

FIG. 6 illustrates a block diagram of a match processing unit (MPU) 601, also referred to as an action unit, that may be used within the exemplary system of FIG. 4 to implement some aspects. The MPU 601 can have multiple functional units, memories, and a register file. For example, the MPU 601 may have an instruction fetch unit 605, a register file unit 606, a communication interface 602, arithmetic logic units (ALUs) 607 and various other functional units.

In the illustrated example, the MPU 601 can have a write port or communication interface 602 allowing for memory read/write operations. For instance, the communication interface 602 may support packets written to or read from an external memory or an internal static random-access memory (SRAM). The communication interface 602 may employ any suitable protocol such as advanced extensible interface (AXI) protocol. AXI is a high-speed/high-end on-chip bus protocol and has channels associated with read, write, address, and write response, which are respectively separated, individually operated, and have transaction properties such as multiple-outstanding address or write data interleaving. The AXI interface 602 may include features that support unaligned data transfers using byte strobes, burst based transactions with only start address issued, separate address/control and data phases, issuing of multiple outstanding addresses with out of order responses, and easy addition of register stages to provide timing closure. For example, when the MPU executes a table write instruction, the MPU may track which bytes have been written to (a.k.a. dirty bytes) and which remain unchanged. When the table entry is flushed back to the memory, the dirty byte vector may be provided to AXI as a write strobe, allowing multiple writes to safely update a single table data structure as long as they do not write to the same byte. In some cases, dirty bytes in the table need not be contiguous and the MPU may only write back a table if at least one bit in the dirty vector is set. Though packet data is transferred according the AXI protocol in the on-chip communications fabric system according to the present exemplary embodiment in the present specification, it can also be applied to a packet data communication on-chip interconnect system operating by other protocols supporting a lock operation, such as advanced high-performance bus (AHB) protocol or advanced peripheral bus (APB) protocol in addition to the AXI protocol.

The MPU 601 can have an instruction fetch unit 605 configured to fetch instructions from a memory external to the MPU based on the input table result or at least a portion of the table result. The instruction fetch unit may support branches and/or linear code paths based on table results or a portion of a table result provided by a table engine. In some cases, the table result may comprise table data, key data and/or a start address of a set of instructions/program. The instruction fetch unit 605 can have an instruction cache 604 for storing one or more programs. In some cases, the one or more programs may be loaded into the instruction cache 604 upon receiving the start address of the program provided by the table engine. In some cases, a set of instructions or a program may be stored in a contiguous region of a memory unit, and the contiguous region can be identified by the address. In some cases, the one or more programs may be fetched and loaded from an external memory via the communication interface 602. This provides flexibility to allow for executing different programs associated with different types of data using the same processing unit. In an example, a management PHV can be injected into the pipeline, for example to perform administrative table direct memory access (DMA) operations or entry aging functions (i.e., adding timestamps), one of the management MPU programs may be loaded to the instruction cache to execute the management function. The instruction cache 604 can be implemented using various types of memories such as one or more SRAMs. The one or more programs can be any programs such as P4 programs related to reading table data, building headers, DMA to/from memory, writing to/from memory, and various other actions. The one or more programs can be executed in any match-action processing stage.

The MPU 601 can have a register file unit 606 to stage data between the memory and the functional units of the MPU, or between the memory external to the MPU and the functional units of the MPU. The functional units may include, for example, ALUs, meters, counters, adders, shifters, edge detectors, zero detectors, condition code registers, status registers, and the like. In some cases, the register file unit 606 may comprise a plurality of general-purpose registers (e.g., R0, R1, . . . Rn) which may be initially loaded with metadata values then later used to store temporary variables within execution of a program until completion of the program. For example, the register file unit 606 may be used to store SRAM addresses, ternary content addressable memory (TCAM) search values, ALU operands, comparison sources, or action results. The register file unit of a stage may also provide data/program context to the register file of the subsequent stage, as well as making data/program context available to the next stage's execution data path (i.e., the source registers of the next stage's adder, shifter, and the like). In some embodiments, each register of the register file is 64 bits and may be initially loaded with special metadata values such as hash value from table lookup, packet size, PHV timestamp, programmable table constant and the like.

In some embodiments, the register file unit 606 can have a comparator flags unit (e.g., C0, C1, . . . Cn) configured to store comparator flags. The comparator flags can be set by calculation results generated by the ALU which in return can be compared with constant values in an encoded instruction to determine a conditional branch instruction. In some embodiments, the MPU can have one-bit comparator flags (e.g., 8 one-bit comparator flags). In practice, an MPU can have any number of comparator flag units each of which may have any suitable length.

The MPU 601 can have one or more functional units such as the ALU(s) 607. An ALU may support arithmetic and logical operations on the values stored in the register file unit 606. The results of the ALU operations (e.g., add, subtract, AND, OR, XOR, NOT, AND NOT, shift, and compare) may then be written back to the register file. The functional units of the MPU may, for example, update or modify fields anywhere in a PHV, write to memory (e.g., table flush), or perform operations that are not related to PHV update. For example, an ALU may be configured to perform calculations on descriptor rings, scatter gather lists (SGLs), and control data structures loaded into the general purpose registers from the host memory.

The MPU 601 can have other functional units such as meters, counters, action insert units, etc. For example, an ALU may be configured to support P4 compliant meters. A meter is a type of action executable on a table match used to measure data flow rates. A meter may include a number of bands, typically two or three, each of which has a defined maximum data rate and optional burst size. Using a leaky bucket analogy, a meter band is a bucket filled by the packet data rate and drained at a constant allowed data rate. Overflow occurs if the integration of data rate exceeding quota is larger than the burst size. Overflowing one band triggers activity into the next band, which presumably allows a higher data rate. In some cases, a field of the packet may be marked as a result of overflowing the base band. This information might be used later to direct the packet to a different queue, where it may be more subject to delay or dropping in case of congestion. The counter may be implemented by the MPU instructions. The MPU can have one or more types of counters for different purposes. For example, the MPU can have performance counters to count MPU stalls. An action insert unit or set of instructions may be configured to push the register file result back to the PHV for header field modifications.

The MPU may be capable of locking a table. In some cases, a table being processed by an MPU may be locked or marked as "locked" in the table engine. For example, while an MPU has a table loaded into its register file, the table address may be reported back to the table engine, causing future reads to the same table address to stall until the MPU has released the table lock. For instance, the MPU may release the lock when an explicit table flush instruction is executed, the MPU program ends, or the MPU address is changed. In some cases, an MPU may lock more than one table address, for example, one for the previous table write-back and another address lock for the current MPU program.

In some embodiments, a single MPU may be configured to execute instructions of a program until completion of the program. In other embodiments, multiple MPUs may be configured to execute a program. A table result can be distributed to multiple MPUs. The table result may be distributed to multiple MPUs according to an MPU distribution mask configured for the tables. This provides advantages to prevent data stalls or mega packets per second (MPPS) decrease when a program is too long. For example, if a PHV requires four table reads in one stage, then each MPU program may be limited to only eight instructions in order to maintain a 100 MPPS if operating at a frequency of 800 MHz in which scenario multiple MPUs may be desirable.

Figure 7:
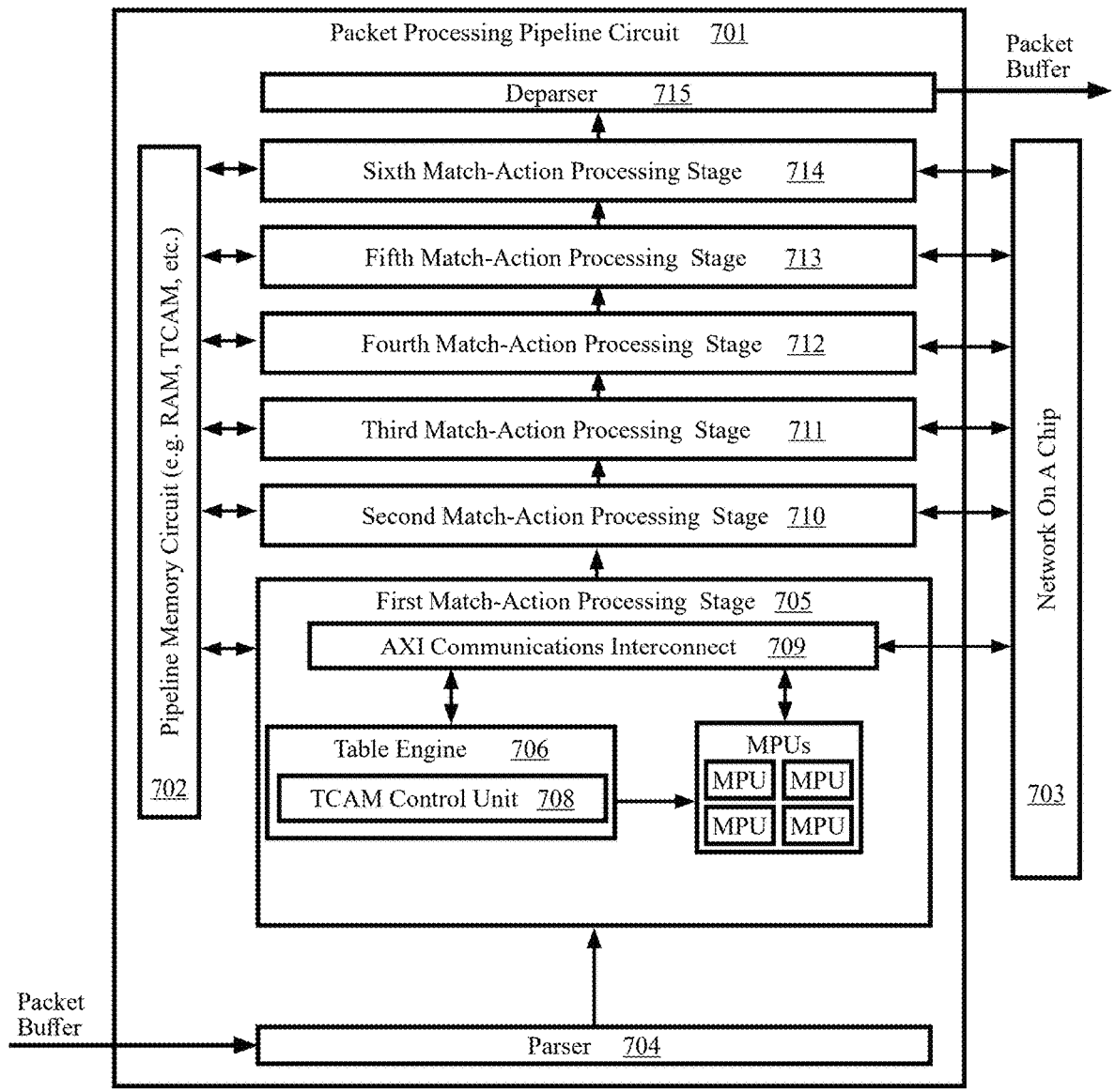
FIG. 7 illustrates a block diagram of a packet processing pipeline circuit that may be included in the exemplary system of FIG. 4.

FIG. 7 illustrates a block diagram of a packet processing pipeline circuit 701 that may be included in the exemplary system of FIG. 4. The packet processing pipeline circuit 701 can be a P4 pipeline implemented by an ASIC. The packet processing pipeline circuit 701 can be programmed to provide various features, including, but not limited to, routing, bridging, tunneling, forwarding, network ACLs, layer 4 firewalls, flow based rate limiting, VLAN tag policies, membership, isolation, multicast and group control, label push/pop operations, layer 4 load balancing, layer 4 flow tables for analytics and flow specific processing, DDOS attack detection, mitigation, telemetry data gathering on any packet field or flow state and various others.

A programmer or compiler may decompose a packet processing program or flow processing data into a set of dependent or independent table lookup and action processing stages (i.e., match-action) that can be mapped onto the table engine and MPU stages. The match-action pipeline can have a plurality of stages. For example, a packet entering the pipeline may be first parsed by a parser (e.g., parser 704) according to the packet header stack specified by a P4 program. This parsed representation of the packet may be referred to as a packet header vector (PHV). The PHV may then be passed through match-action processing stages (e.g., match-action processing stages 705, 710, 711, 712, 713, 714) of the match-action pipeline. Each match-action processing stage can be configured to match one or more PHV fields to tables and to update the PHV, table entries, or other data according to the actions specified by the P4 program. If the required number of stages exceeds the implemented number of stages, a packet can be recirculated for additional processing. The packet payload may travel in a separate queue or buffer until it is reassembled with its PHV in a deparser 715. The deparser 715 can rewrite the original packet according to the PHV fields which may have been modified in the pipeline. A packet processed by an ingress pipeline may be placed in a packet buffer for scheduling and possible replication. In some cases, once the packet is scheduled and leaves the packet buffer, it may be parsed again to create an egress PHV. The egress PHV may be passed through a P4 egress pipeline in a similar fashion as a packet passing through a P4 ingress pipeline, after which a final deparser operation may be executed before the packet is sent to its destination interface or recirculated for additional processing. The networking device 430 of FIG. 4 can have a P4 pipeline that is implemented via a packet processing pipeline circuit 701.

A packet processing pipeline circuit 701 can have multiple parsers and can have multiple deparsers. The parser can be a P4 compliant programmable parser and the deparser can be a P4 compliant programmable deparser. The parser may be configured to extract packet header fields according to P4 header definitions and place them in a PHV. The parser may select from any fields within the packet and align the information from the selected fields to create the PHV. The deparser can be configured to rewrite the original packet according to an updated PHV. The pipeline MPUs of the match-processing stages 705, 710, 711, 712, 713, 714 can be the same as the MPU 601 of FIG. 6. Match-action processing stages can have any number of MPUs. The match-action processing stage of a match-action pipeline can all be identical.

A table engine 706 may be configured to support per-stage table match. For example, the table engine 706 may be configured to hash, lookup, and/or compare keys to table entries. The table engine 706 may be configured to control the address and size of the table, use PHV fields to generate a lookup key, and find Session Ids or MPU instruction pointers that define the P4 program associated with a table entry. A table result produced by the table engine can be distributed to the multiple MPUs.

The table engine 706 can be configured to control a table selection. In some cases, upon entering a stage, a PHV is examined to select which table(s) to enable for the arriving PHV. Table selection criteria may be determined based on the information contained in the PHV. In some cases, a match table may be selected based on packet type information related to a packet type associated with the PHV. For instance, the table selection criteria may be based on a debug flag, packet type or protocols (e.g., Internet Protocol version 4 (IPv4), Internet Protocol version 6 (IPv6), MPLSA, or the next table ID as determined by the preceding stage. In some cases, the incoming PHV may be analyzed by the table selection logic, which then generates a table selection key and compares the result using a TCAM to select the active tables. A table selection key may be used to drive table hash generation, table data comparison, and associated data into the MPUs.

The table engine 706 can have a ternary content-addressable memory (TCAM) control unit 708. The TCAM control unit may be configured to allocate memory to store multiple TCAM search tables. In an example, a PHV table selection key may be directed to a TCAM search stage before a SRAM lookup. The TCAM control unit may be configured to allocate TCAMs to individual pipeline stages to prevent TCAM resource conflicts, or to allocate TCAM into multiple search tables within a stage. The TCAM search index results may be forwarded to the table engine for SRAM lookups. The table engine 706 may be implemented by hardware or circuitry. The table engine may be hardware defined. In some cases, the results of table lookups or table results are provided to the MPU in its register file.

A match-action pipeline can have multiple match-action processing stages such as the six units illustrated in the example of FIG. 7. In practice, a match-action pipeline can have any number of match-action processing stages. The match-action processing stages can share a pipeline memory circuit 702 that can be static random-access memory (SRAM), TCAM, some other type of memory, or a combination of different types of memory. The packet processing pipeline circuit stores data in the pipeline memory circuit. For example, the packet processing pipeline circuit can store a table in the pipeline memory circuit that configures the packet processing pipeline circuit to process specific network flows. For example, a flow table or multiple flow tables may be stored in the pipeline memory circuit 702 and can store instructions and data that the packet processing pipeline circuit uses to process a packet. The pipeline memory circuit is more than half full when it is storing data used by the packet processing pipeline circuit and less than half the capacity of the pipeline memory circuit is free.

Figure 8:
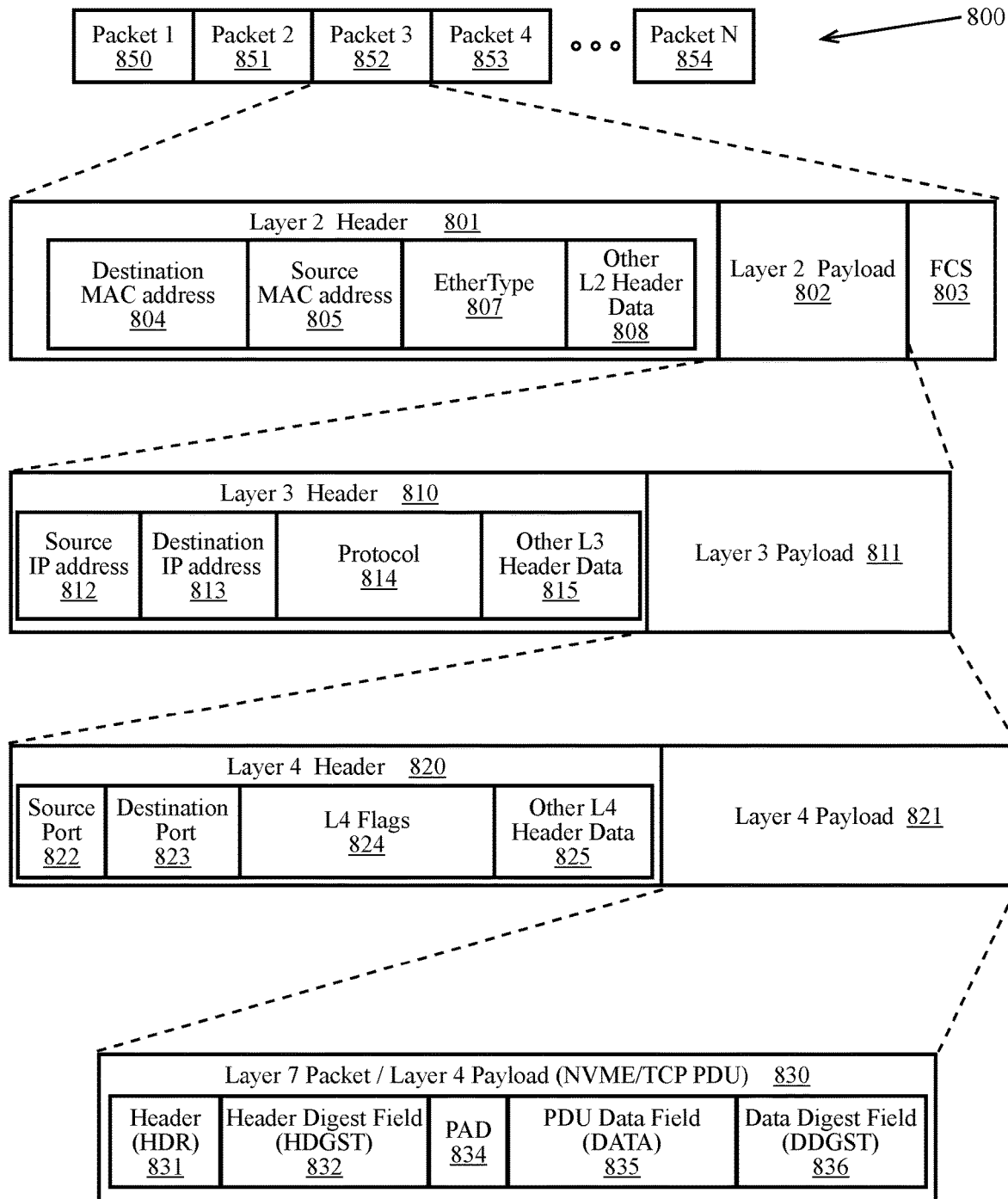
FIG. 8 illustrates packet headers and payloads of packets for network flows including a NVMe/TCP PDU in a layer 4 payload according to some aspects.

FIG. 8 illustrates packet headers and payloads of packets for a network flow 800 including layer 7 fields according to some aspects. A group of network packets passing from one specific endpoint to another specific endpoint is a network flow. A network flow 800 can have numerous network packets such as a first packet 850, a second packet 851, a third packet 852, a fourth packet 853, and a final packet 854 with many more packets between the fourth packet 853 and the final packet 854. The term "the packet" or "a packet" may refer to any of the network packets in a network flow.

Packets can be constructed and interpreted in accordance with the internet protocol suite. The Internet protocol suite is the conceptual model and set of communications protocols used in the Internet and similar computer networks. A packet can be transmitted and received as a raw bit stream over a physical medium at the physical layer, sometimes called layer 1. The packets can be received by a RX MAC 211 as a raw bit stream or transmitted by TX MAC 210 as a raw bit stream.

The link layer is often called layer 2. The protocols of the link layer operate within the scope of the local network connection to which a host is attached and includes all hosts accessible without traversing a router. The link layer is used to move packets between the interfaces of two different hosts on the same link. The packet (an Ethernet packet is shown) has a layer 2 header 801, a layer 2 payload 802, and a layer 2 frame check sequence (FCS) 803. The layer 2 header can contain a source MAC address 804, a destination MAC address 805, an optional 802.1Q header 806, optional VLAN tag information 807, and other layer 2 header data 808. The input ports 211 and output ports 210 of a networking device 201 can have MAC addresses. A networking device 201 can have a MAC address that is applied to all or some of the ports. Alternatively, a networking device may have one or more ports that each have their own MAC address. In general, each port can send and receive packets. As such, a port of a networking device can be configured with a RX MAC 211 and a TX MAC 210. Ethernet, also known as Institute of Electrical and Electronics Engineers (IEEE) 802.3, is a layer 2 protocol. IEEE 802.11 (WiFi) is another widely used layer 2 protocol. The layer 2 payload 802 can include a layer 3 packet. The layer 2 FCS 803 can include a CRC (cyclic redundancy check) calculated from the layer 2 header and layer 2 payload. The layer 2 FCS can be used to verify that the packet has been received without errors.

IEEE 802.1Q is the networking standard that supports VLANs on IEEE 802.3 networks. The optional 802.1Q header 806 and VLAN tag information 807 are specified by the IEEE 802.1Q standard. The 802.1Q header is the two-octet value 0x8100 that indicates that VLAN tag information 807 is present. The VLAN tag information includes a 12-bit VLAN identifier. As such, a LAN can be configured to have 4094 VLANs (0x000 and 0xFFF are reserved values).

The internet layer, often called layer 3, is the network layer where layer 3 packets can be routed from a first node to a second node across multiple intermediate nodes. The nodes can be networking devices such as networking device 201. Internet protocol (IP) is a commonly used layer 3 protocol that is specified in requests for comment (RFCs) published by the Internet Engineering Task Force (IETF). More specifically, the format and fields of IP packets are specified by IETF RFC 791. The layer 3 packet (an IP packet is shown) can have a layer 3 header 810 and a layer 3 payload 811. The layer 3 header of an IP packet is an IP header and the layer 3 payload of an IP packet is an IP payload. The layer 3 header 810 can have a source IP address 812, a destination IP address 813, a protocol indicator 814, and other layer 3 header data 815. As an example, a first node can send an IP packet to a second node via an intermediate node. The IP packet therefore has a source IP address indicating the first node and a destination IP address indicating the second node. The first node makes a routing decision that the IP packet should be sent to the intermediate node. The first node therefore sends the IP packet to the intermediate node in a first layer 2 packet. The first layer 2 packet has a source MAC address 804 indicating the first node, a destination MAC address 805 indicating the intermediate node, and has the IP packet as a payload. The intermediate node receives the first layer 2 packet. Based on the destination IP address, the intermediate node determines that the IP packet is to be sent to the second node. The intermediate node sends the IP packet to the second node in a second layer 2 packet having a source MAC address 804 indicating the intermediate node, a destination MAC address 805 indicating the second node, and the IP packet as a payload. The layer 3 payload 811 can include headers and payloads for higher layers in accordance with higher layer protocols such as transport layer protocols.

The transport layer, often called layer 4, can establish basic data channels that applications use for task-specific data exchange and can establish host-to-host connectivity. A layer 4 protocol can be indicated in the layer 3 header 810 using protocol indicator 814. Transmission control protocol (TCP, specified by IETF RFC 793), user datagram protocol (UDP, specified by IETF RFC 768), and internet control message protocol (ICMP, specified by IETF RFC 792) are common layer 4 protocols. TCP is often referred to as TCP/IP. TCP is connection oriented and can provide reliable, ordered, and error-checked delivery of a stream of bytes between applications running on hosts communicating via an IP network. When carrying TCP data, a layer 3 payload 811 includes a TCP header and a TCP payload. UDP can provide for computer applications to send messages, in this case referred to as datagrams, to other hosts on an IP network using a connectionless model. When carrying UDP data, a layer 3 payload 811 includes a UDP header and a UDP payload. ICMP is used by network devices, including routers, to send error messages and operational information indicating success or failure when communicating with another IP address. ICMP uses a connectionless model.

A layer 4 packet (a TCP packet is shown) can have a layer 4 header 820 (a TCP header is shown) and a layer 4 payload 821 (a TCP payload is shown). The layer 4 header 820 can include a source port 822, destination port 823, layer 4 flags 824, and other layer 4 header data 825. The source port and the destination port can be integer values used by host computers to deliver packets to application programs configured to listen to and send on those ports. The layer 4 flags 824 can indicate a status of or action for a network flow. A layer 4 payload 821 can contain a layer 7 packet.

The application layer, often called layer 7, includes the protocols used by most applications for providing user services or exchanging application data over the network connections established by the lower level protocols. Examples of application layer protocols include NVMe/TCP, RDMA over Converged Ethernet version 2, (RoCE v2), Hypertext Transfer Protocol (HTTP), File Transfer Protocol (FTP), Simple Mail Transfer Protocol (SMTP), and Dynamic Host Configuration (DHCP). Data coded according to application layer protocols can be encapsulated into transport layer protocol data units (such as TCP or UDP messages), which in turn use lower layer protocols to effect actual data transfer.

A layer 4 payload 821 may include a layer 7 packet 830. The illustrated layer 7 packet is a NVMe/TCP PDU 830. NVM Express, Inc. is a trade organization that provides standards for NVMe communications. Version 1.0 of the NVM Express TCP Transport Specification was published on May 18, 2021 and discloses the contents and structure of NVMe PDUs. An NVMe/TCP PDU can include a header 831, a header digest field 832, a pad 834, a PDU data field 835, and a data digest field 836.

Figure 9:
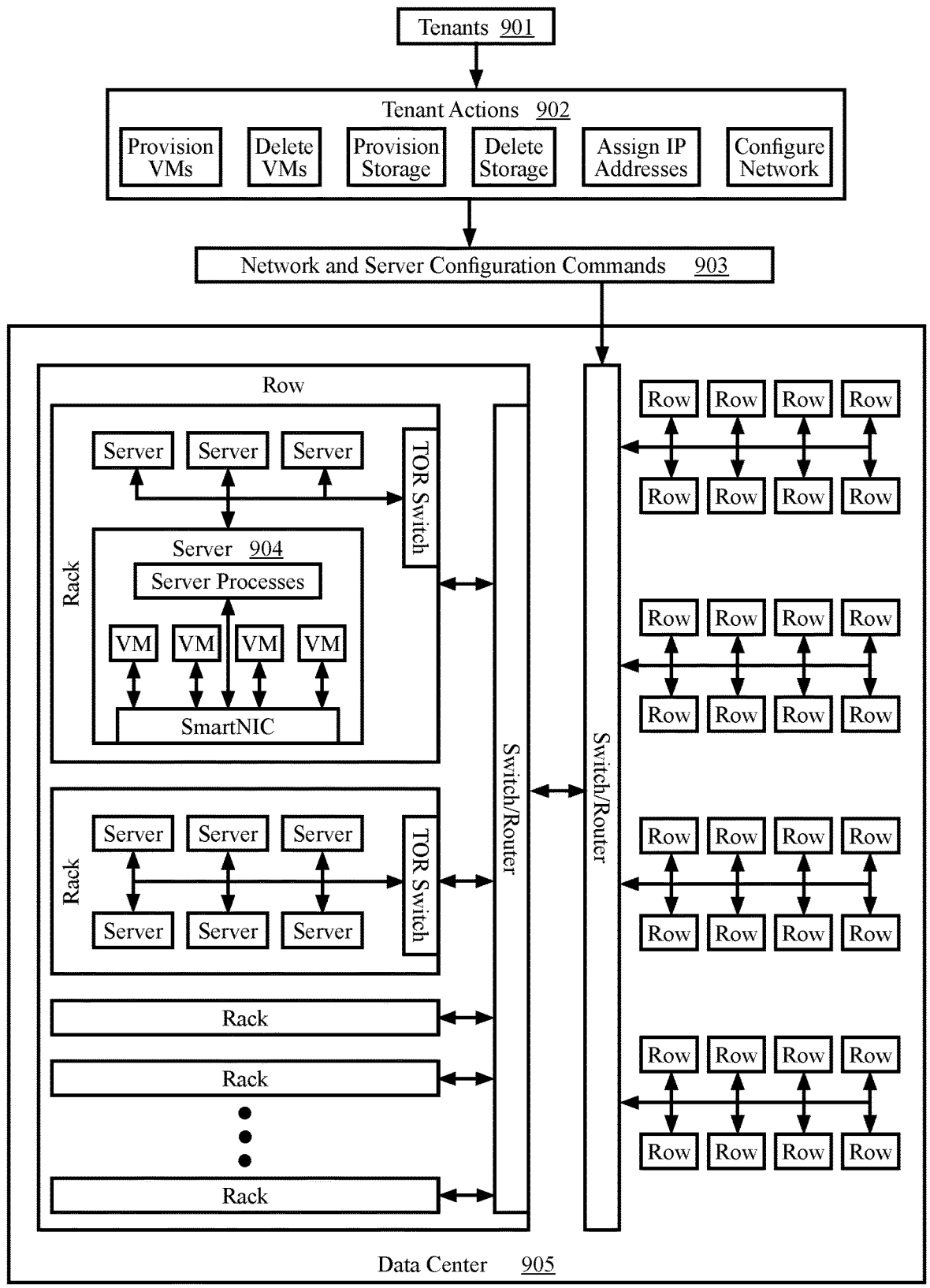
FIG. 9 is a high-level conceptual diagram that illustrates a data center with workloads and a network configuration that is in constant flux due to tenant operations according to some aspects.

FIG. 9 is a high-level conceptual diagram that illustrates a data center 905 with workloads and a network configuration that is in constant flux due to tenant operations according to some aspects. The data center 905 has rows of racks of servers such as server 904. The server 904 is running server processes, such as operating system processes, and numerous VMs for the tenants 901 of the data center 905. The server 904 has a SmartNIC that provides network connectivity to server processes and VMs. The SmartNIC is connected to a top-of-rack (TOR) switch that provides network connectivity to all the servers in the rack. The TOR switch is connected to a switch or router that may provide network connectivity to an entire row of racks. Yet another switch can provide network connectivity to numerous rows of racks of servers. The tenants 901 can perform tenant actions 902 such as provisioning VMs, deleting VMs, provisioning storage, deleting storage, assigning IP addresses, configuring subnets, etc. The tenants' actions 902 can be passed into the data center as network and server configuration commands 903. FIG. 9 is provided to show the scale of the problem that data centers have with network configuration and syncing between HA peers. Note—no HA peers are explicitly shown, but adding additional SmartNICs to servers, TOR switches to racks, and additional routers and switches approaches the efforts that data centers make to provide redundancy in the case of failures.

Figure 10:
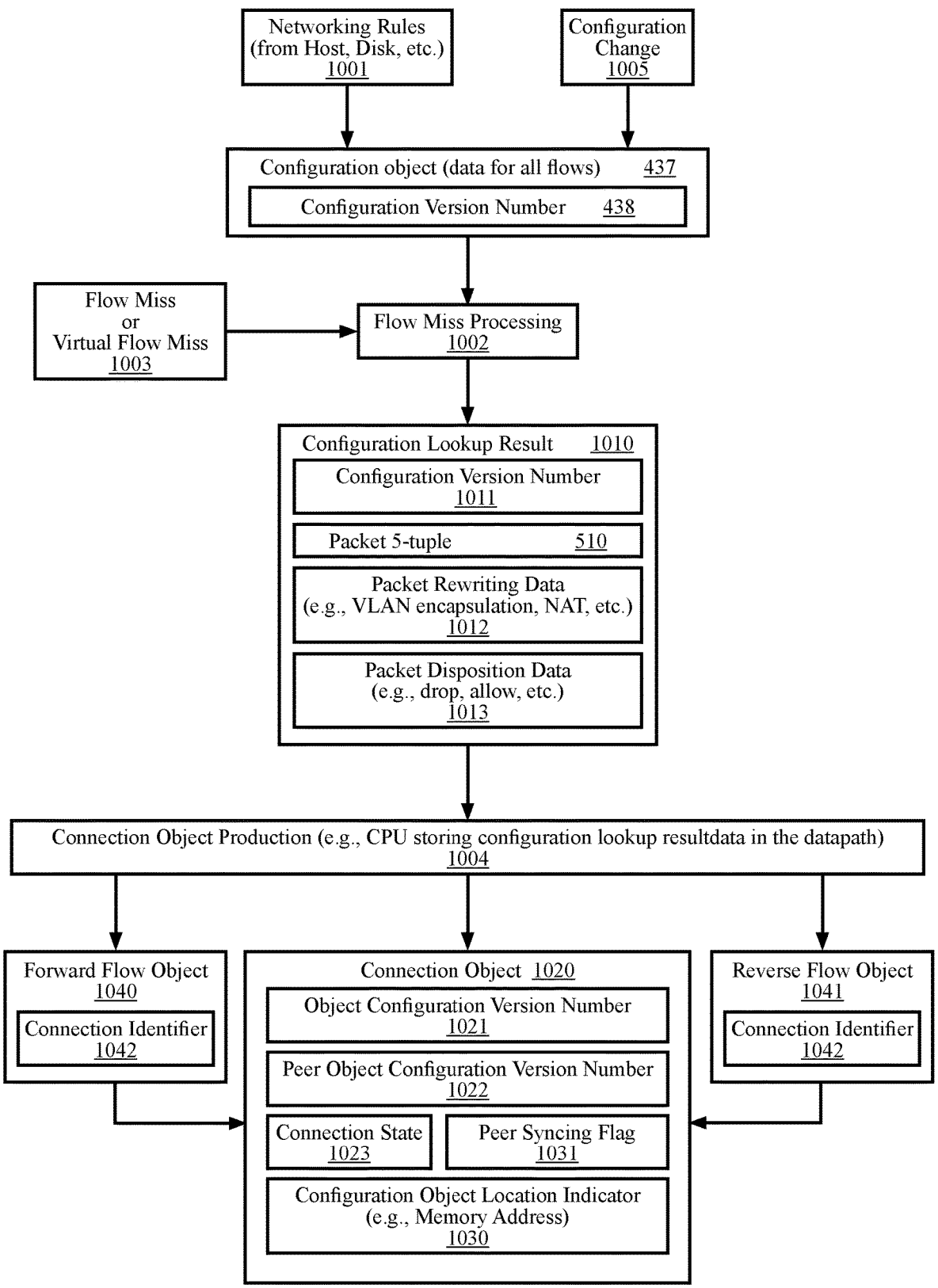
FIG. 10 is a high-level conceptual diagram that illustrates connection objects and configuration objects being produced in accordance with networking rules and network configuration commands according to some aspects.

FIG. 10 is a high-level conceptual diagram that illustrates connection objects and configuration objects being produced in accordance with networking rules 1001 and network configuration commands according to some aspects. The networking rules can be stored in a configuration object 437 that has a configuration version number 438. Network configuration commands can result in a configuration change 1005 that is applied to the configuration object. The configuration version number 438 can be incremented when the configuration object 437 changes. The packet processing pipeline circuit 701 can generate a flow miss or a virtual flow miss 1003 when attempting to process a network packet. A flow miss indicates that a connection object for processing the network packet is nonexistent. A virtual flow miss indicates that the connection object for processing the network packet is obsolete. A flow miss or a virtual flow miss can cause flow miss processing 1002 to be performed. Flow miss processing can apply the networking rules and other data in the configuration object 437 to the packet that caused the flow miss. The result of flow miss processing 1002 is a configuration lookup result 1010 that can include a configuration version number 1011, a packet 5-tuple 510, packet rewriting data 1012, and packet disposition data 1013. The configuration version number 1011 can equal the configuration version number 438 of the configuration object 437. The packet rewriting data 1012 can indicate how the packet is to be rewritten (e.g., encapsulation, NAT, etc.). The packet disposition data 1013 can indicate the packet's disposition (e.g., block, allow, etc.).

A connection object 1020 can be produced from the configuration lookup result 1010 by, for example, storing the configuration lookup result 1010 as one of the connection objects 441 in the memory 432 or overwriting a connection object already stored in the memory. A forward flow object 1040 and a reverse flow object 1041 may also be produced and stored in a flow table that is stored in the memory or in a pipeline memory. The forward flow object 1040 and the reverse flow object 1041 may each include a connection identifier that indicates the connection object 1020. When a packet is received and parsed, the packet 5-tuple or other packer header data can be used to look up a flow object in a flow table. That particular flow object can be the forward flow object 1040 or the reverse flow object 1041 for a connection. The connection identifier in the flow object indicates the connection's connection object. A connection object 1020 can include an object configuration version number 1021, a peer object configuration number 1022, a connection state 1023, a peer syncing flag 1031, and a configuration object location identifier 1030. The object configuration version number 1021 can be used to determine whether the connection object 1020 is obsolete. The peer object configuration number 1022 can be used to determine whether a peer node's version of the connection object is obsolete. The connection state 1023 can indicate the state of a connection. For example, TCP connections pass through a series of well known states as they are brought up, used, and torn down. The peer syncing flag 1031 can indicate that a sync packet has been sent to the peer node and that a sync ack packet responsive to the sync request packet has not yet been received. The configuration object location identifier 1030 can indicate the memory location of the configuration object 437 or the configuration version number 438.

Figure 11:
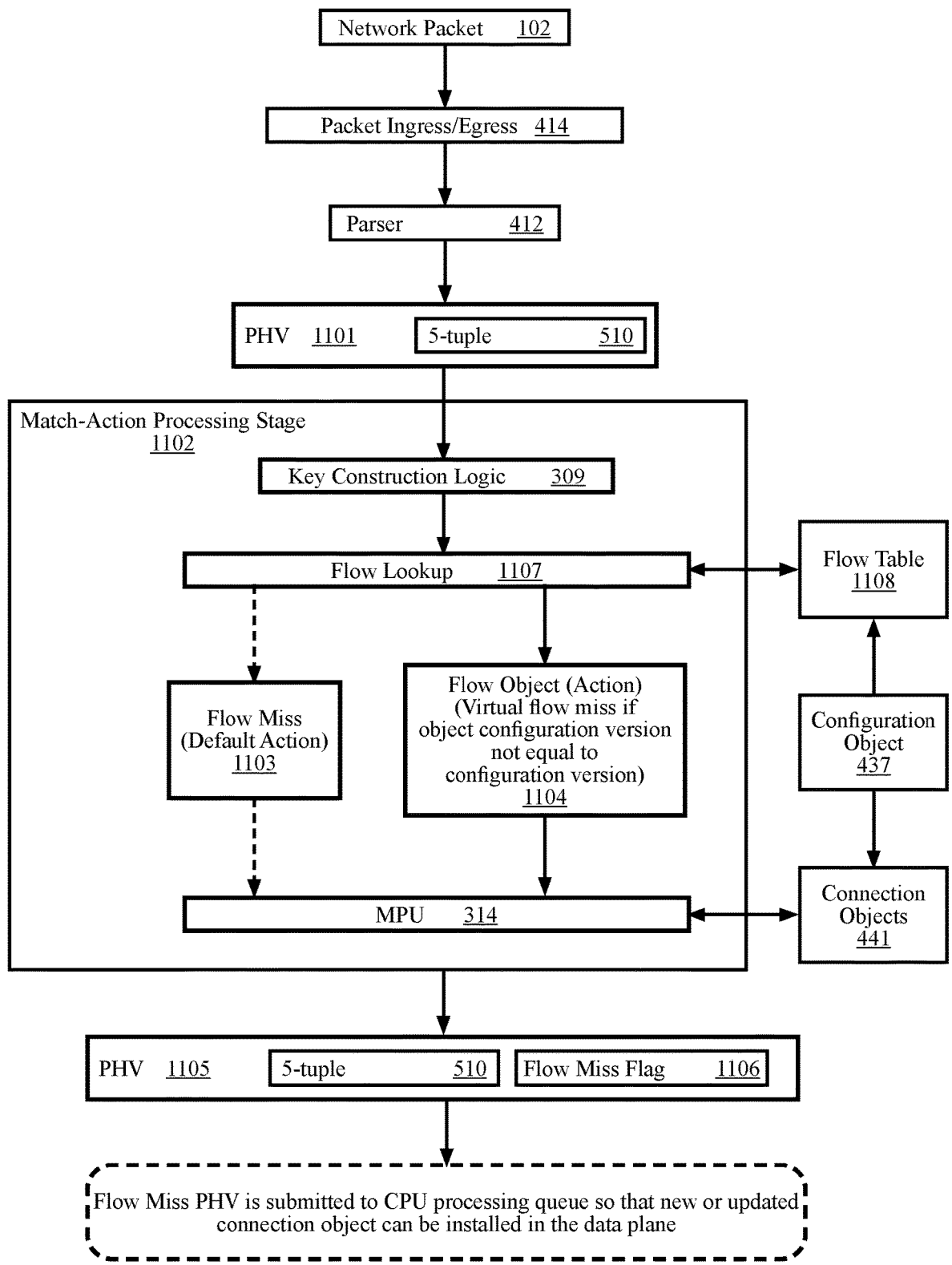
FIG. 11 is a high-level conceptual diagram that illustrates a packet processing pipeline stage producing a PHV that may indicate a flow miss or a virtual flow miss according to some aspects.

FIG. 11 is a high-level conceptual diagram that illustrates a packet processing pipeline stage producing a PHV that may indicate a flow miss or a virtual flow miss according to some aspects. A network packet 102 can be received by the packet ingress port 211 of a networking device and then sent to the packet processing pipeline circuit for processing. The parser circuit 412 of the packet processing pipeline circuit produces a PHV 1101 by parsing the network packet 102. A match-action processing stage 1102 of the packet processing pipeline circuit receives the PHV. The key construction logic 309 of the match-action processing stage 1102 can generate a key by, for example, hashing the packet 5-tuple. A flow lookup 1107 uses the key to query a flow table 1108 and thereby locate the flow object 1104, if any, that has been stored in association with the key. Here, the flow object is the "action" that is looked up in the match-action table. The actions (flow objects) stored in the flow table 1108 can be provided by the configuration lookup result 1010. If there is no action stored in association with the key, then a flow miss 1103 occurs. The flow miss 1103 can cause a flow miss flag 1106 to be set in the PHV 1105. If an action is stored in association with the key, that action is obtained from the flow table 1108. The action can instruct the MPU 314 to read the object configuration version number 1021 from a connection object, read the configuration version number 438 from the configuration object 437, compare the object configuration version number 1021 and the configuration version number 438 and generate a virtual flow miss if the configuration version number is not equal to the object configuration version number. A virtual flow miss occurs when the key lookup does not fail, but the action performed by the MPU 314 is or causes a flow miss. The virtual flow miss can be indicated by setting the flow miss flag 1106 in the PHV. After a flow miss (actual or virtual), the PHV can be submitted to the control plane (e.g., a CPU input queue) for flow miss processing. Flow miss processing includes configuring the data plane for the network flow and sending a sync request packet to the peer device.

Figure 12:
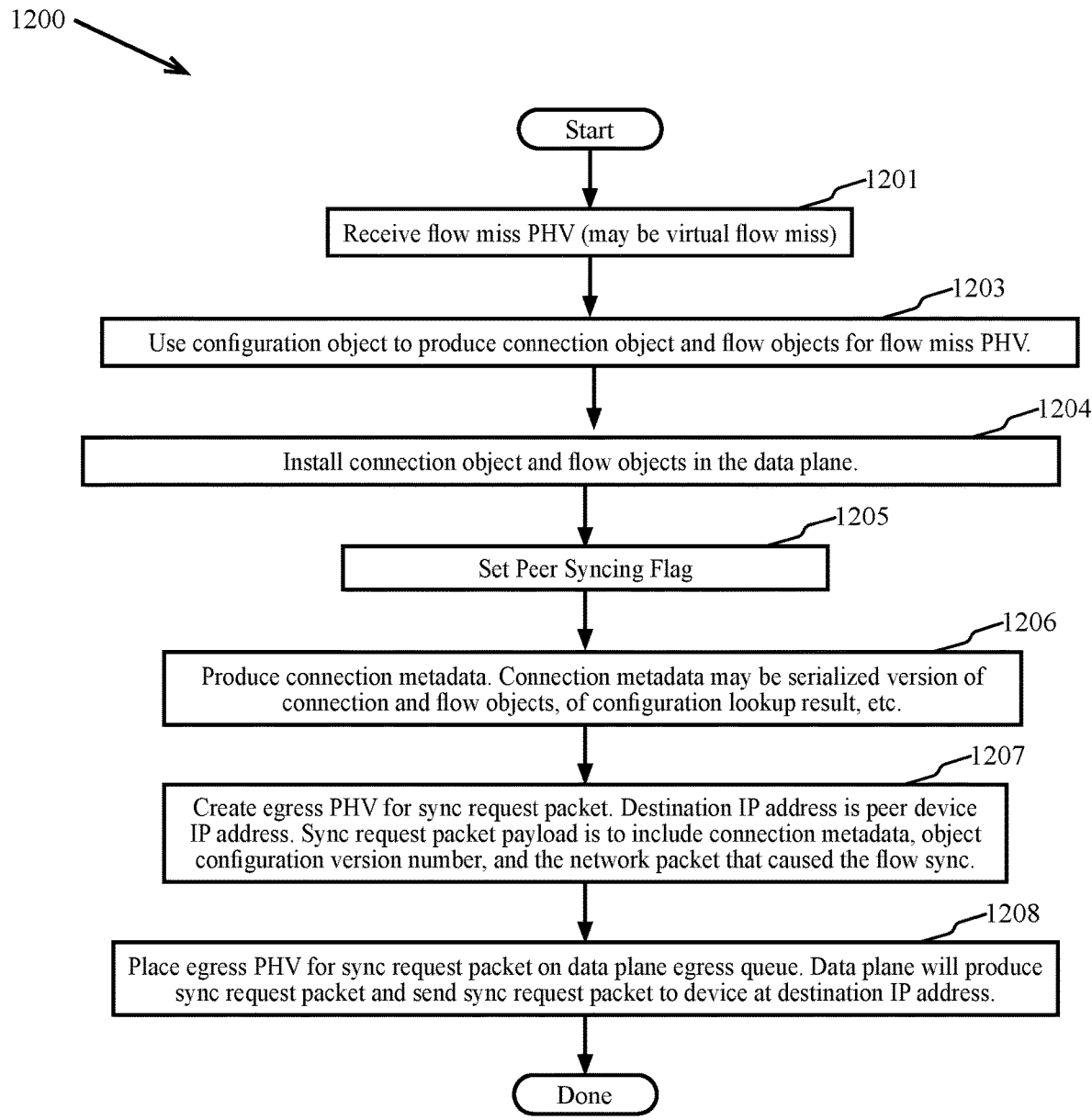
FIG. 12 is a high-level flow diagram that illustrates a process for a control plane of a networking device to process a flow miss according to some aspects.

FIG. 12 is a high-level flow diagram that illustrates a process for a control plane of a networking device to process a flow miss 1200 according to some aspects. The process illustrated in FIG. 12 may be performed by the CPU 403. After the start, at block 1201 the flow miss PHV is received. The flow miss PHV may be the result of a virtual flow miss. At block 1203, the configuration object can be used to produce the connection object and flow objects for the flow miss PHV. At block 1204, the connection object and flow objects are installed in the data plane. A connection object can be installed in the data plane by storing it in a session table. A flow object can be installed in a data plane by storing it in a flow table. At block 1205, the peer syncing flag 1031 is set. At block 1206, the process can produce connection metadata. The connection metadata is produced from the configuration object. For example, the configuration object can be used to produce a configuration lookup result that is used to produce the connection metadata. In another example, the configuration lookup result is used to produce a connection object and flow objects that are used to produce the connection metadata. The connection metadata may be a serialized version of the connection object and flow objects, of the configuration lookup result 1010, etc. At block 1207, the process can create an egress PHV for a sync request packet. The destination IP address of the sync request packet is the peer device's IP address. The sync request packet's payload can include the connection metadata, object configuration version number, and the network packet that caused the flow sync. In some embodiments, the object configuration version number is included in the connection metadata. At block 1208, the process can place the egress PHV for the sync request packet on a data plane egress queue. The data plane will produce the sync request packet (e.g., the deparser can assemble packets from PHVs) and send the sync request packet to the device at destination IP address.

In FIG. 10, a configuration change 1005 causes the configuration object 437 to be updated to a new version. For example, the networking device may receive a network configuration command that includes the configuration change. Another aspect is that a network packet can indicate a connection state change that causes the connection state of the connection object to change. For example, the connection object can be created when a TCP session is being brought up. TCP sessions go through a well-established and standardized (see IETF RFC 9293) series of connection states as they are brought up and as they are torn down. The network packets that are used for bringing up and tearing down the TCP session can indicate connection state changes. The packet processing pipeline circuit may write the updated connection state into the connection object and may generate a sync packet for updating the per node's version of the connection object.

Figure 13:
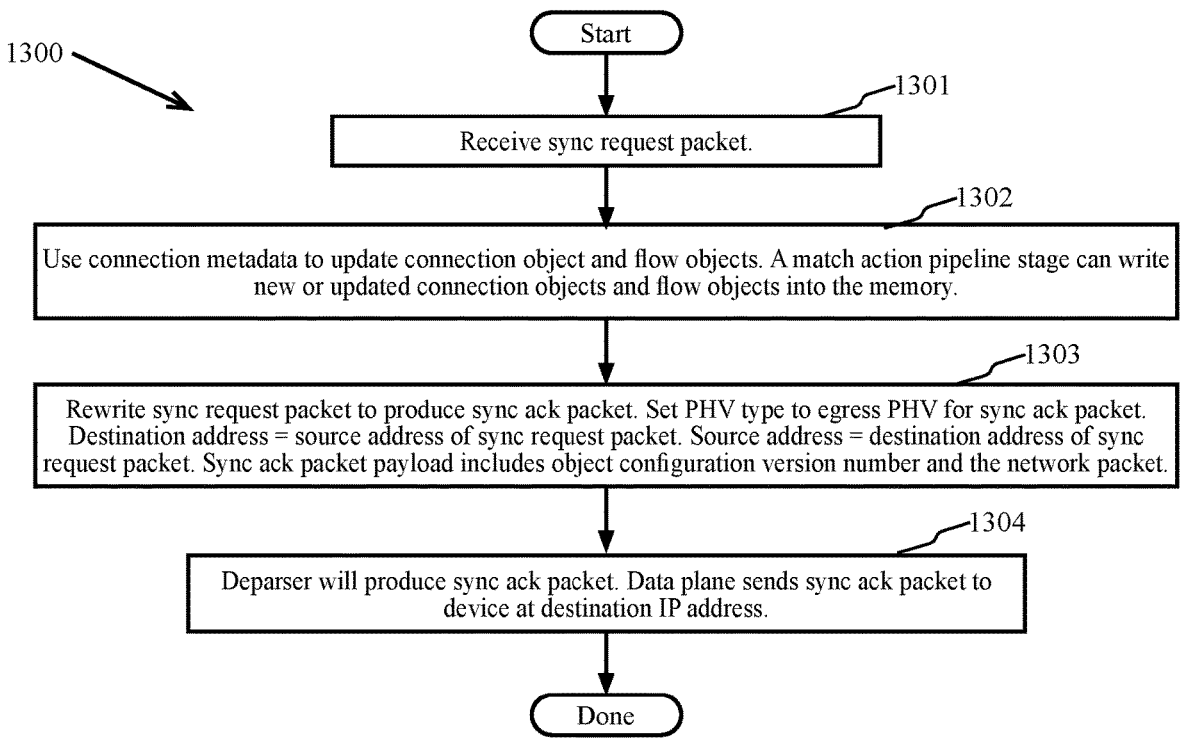
FIG. 13 is a high-level flow diagram that illustrates a process that may be performed by a match-action pipeline that processes a sync request packet and returns a sync response packet according to some aspects.

FIG. 13 is a high-level flow diagram that illustrates a process that may be performed by a match-action pipeline to process a sync request packet and returns a sync response packet 1300 according to some aspects. After the start, at block 1301 the sync request packet is received. At block 1302, the process can use the connection metadata in the sync request packet to create or update a connection object in memory. A match-action pipeline stage can write the new or updated connection object into the memory. At block 1303, the process can use a packet processing pipeline circuit to rewrite the sync request packet to produce the sync ack packet. The pipeline can set the PHV type of the sync request packet to egress PHV, set the destination address to the source address of the sync request packet, and set the source address to the destination address of the sync request packet. The configuration metadata in the sync request packet may be deleted. The object configuration version number 128 may remain. The payload still includes the network packet that was encapsulated in the sync request packet. At block 1304, the deparser will produce the sync ack packet from the egress PHV that is produced by rewriting the sync request packet's PHV. The data plane sends the sync ack packet to the device at the destination IP address.

Figure 14:
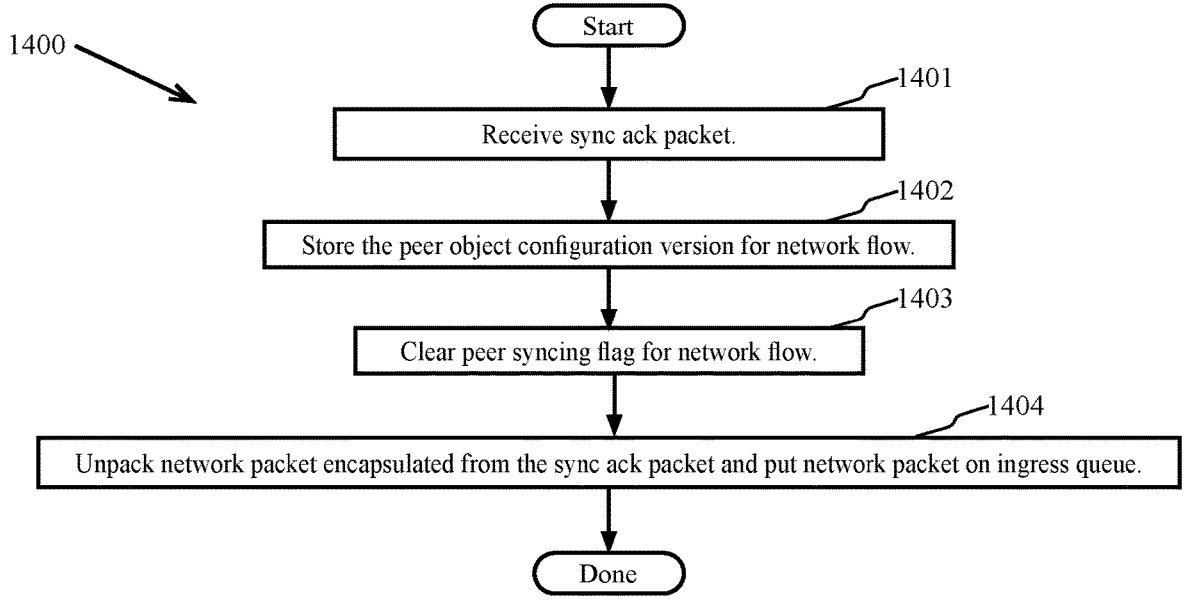
FIG. 14 is a high-level flow diagram that illustrates a process that may be performed by a match-action pipeline that processes a sync ack packet according to some aspects.

FIG. 14 is a high-level flow diagram that illustrates a process that may be performed by a match-action pipeline that processes a sync ack packet 1400 according to some aspects. The sync ack packet is responsive to the sync request packet. After the start, at block 1401 the sync ack packet is received. At block 1402 the process can store the peer object configuration version for the network flow. At block 1403 the process can clear the peer syncing flag for the network flow. At block 1404 the process can unpack the network packet encapsulated in the sync ack packet and put the network packet on an ingress queue. The network packet may then be processed normally.

FIGS. 12-14 illustrate processes that can be performed by two networking devices to synchronize a connection object. The first networking device can produce a sync request packet and send it to the peer. The peer processes the sync request packet and returns a sync ack packet. The first networking device then processes the sync ack packet. The peer device can be a second networking device that is also processing network flows and synchronizing connection objects with the first networking device. As such the peer can produce a second sync request packet and send it to the first networking device. The first networking device processes the second sync request packet and returns a second sync ack packet to the peer. The peer then processes the second sync ack packet. The second sync request packet includes a second network packet and a second connection metadata for the second network packet. The second sync ack packet includes the second network packet and a second object configuration version number that is the object configuration version number of the second connection object. The first networking device can use the second connection metadata to create or update a second connection object.

Figure 15:
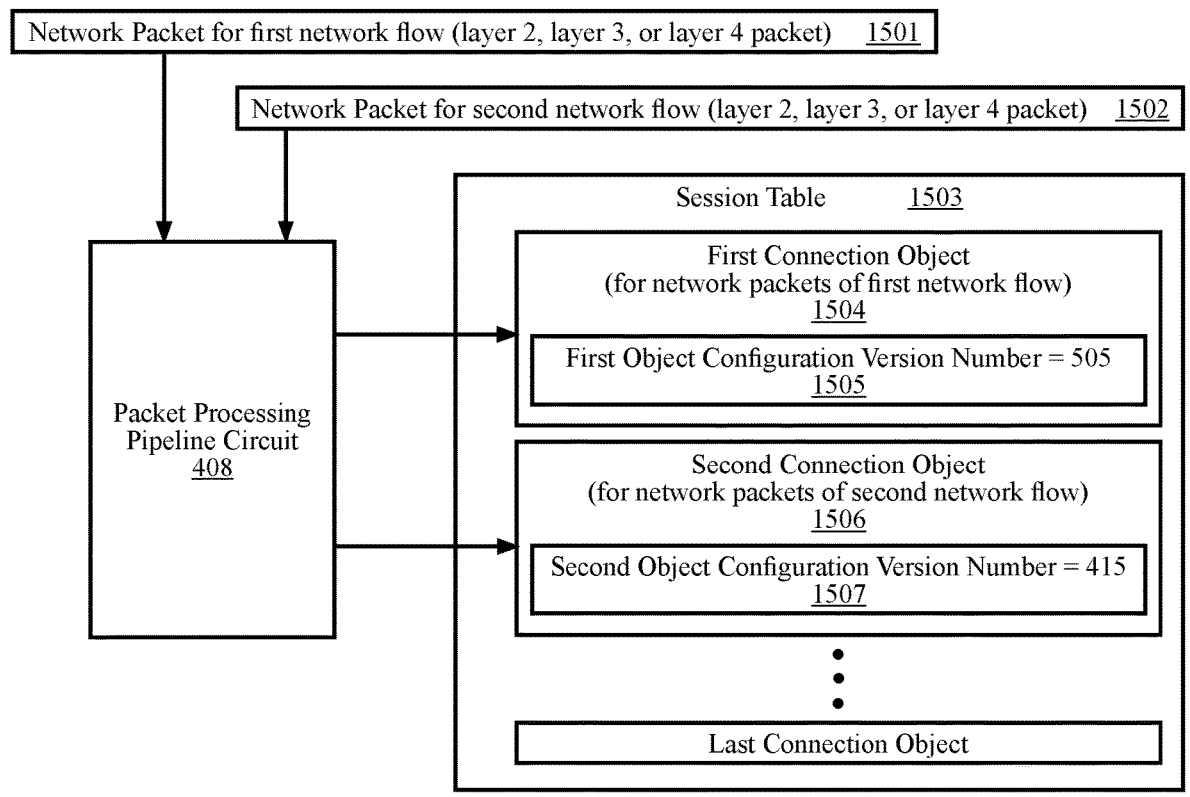
FIG. 15 is a high-level conceptual diagram that illustrates a packet processing pipeline circuit processing network packets of different network flows according to some aspects.

FIG. 15 is a high-level conceptual diagram that illustrates a packet processing pipeline circuit 408 processing network packets of different network flows according to some aspects. Different connection objects can be used for different network flows. The packet processing pipeline circuit 408 receives a network packet for a first network flow 1501 and also receives a network packet for a second network flow 1502. The session table 1503 entries used by the packet processing pipeline circuit 408 contain different entries for the first network flow and the second network flow. A first connection object 1504 is used for processing the first network flow. The first connection object 1504 has an object configuration version number 1505 indicating a version (e.g., 505). A second connection object 1506 is used for processing the second network flow. The second connection object 1506 has an object configuration version number 1507 indicating another version (e.g., 415). There are different version numbers indicated for the different configuration objects produced for those two flows. This situation may occur when one networking device and its peer have configuration objects with different configuration version numbers. A sync request packet from the peer may have caused the second connection object 1506 to be stored in the session table 1503.

Figure 16:
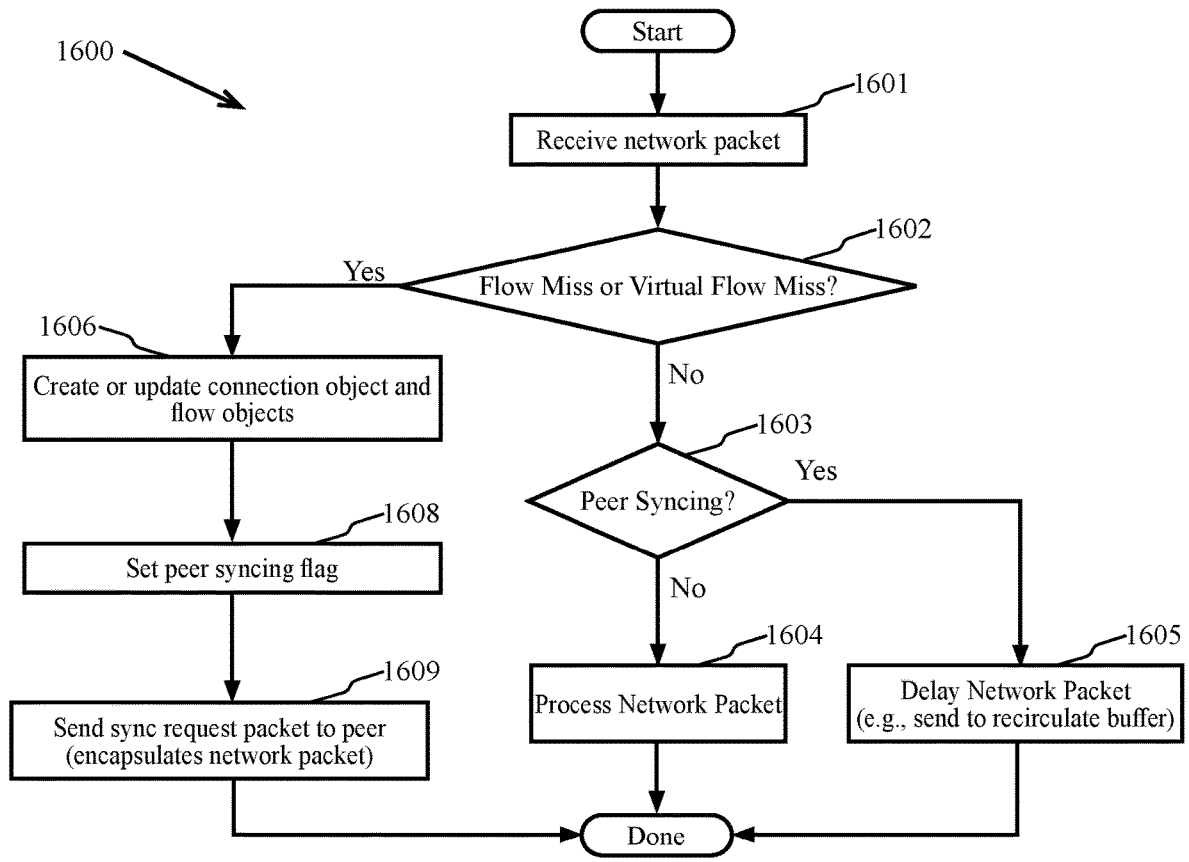
FIG. 16 is a high-level flow diagram that illustrates a process that may be performed by a networking device that is processing a network packet according to some aspects.

FIG. 16 is a high-level flow diagram that illustrates a process that may be performed by a networking device that is processing a network packet 1600 according to some aspects. After the start, at block 1601 a network packet is received. At decision block 1602, the process determines whether the network packet causes a flow miss or a virtual flow miss. If the packet causes a flow miss or a virtual flow miss, the process moves to block 1606. Otherwise, the process continues to decision block 1603. At decision block 1603, the process determines if the peer syncing flag is set for the network flow of the network packet. If the peer syncing flag is set, the process moves to block 1605, otherwise the process continues to block 1604. At block 1604, the network packet is processed normally before the process is done. At block 1605, the network packet is delayed before the process is done. The packet can be delayed by, for example, placing it in a recirculation buffer or recirculation queue, encapsulating it in a sync request packet and sending it to the peer device, etc. At block 1606, the process can create or update the connection object and flow object for the network flow that includes the network packet. At block 1608, the peer syncing flag can be set. At block 1609, a sync request packet for the network flow can be sent to the peer device before the process is done. It may be unnecessary to update the forward flow object and the reverse flow object at block 1606 because only the connection object is changed. For example, the flow objects may contain little more than pointers to the connection object. In such a case, the flow objects may stay the same from the time they are created until the time they are deleted.

Figure 17:
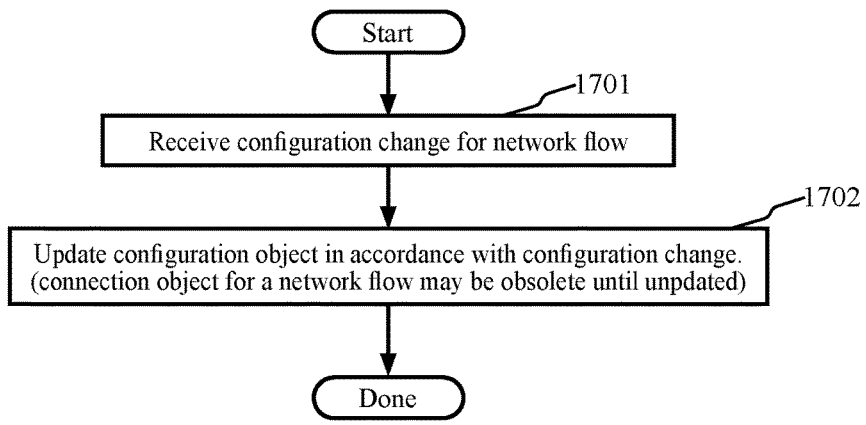
FIG. 17 is a high-level flow diagram that illustrates a process that makes a connection object obsolete according to some aspects.

FIG. 17 is a high-level flow diagram that illustrates a process that makes a connection object obsolete according to some aspects. After the start, at block 1701 a configuration change is received that changes the processing needed for a network flow. At block 1702, the configuration object for the network flow is updated in accordance with the configuration change. Updating the configuration object includes increasing the configuration version number of the configuration object. The connection object is therefore obsolete until it is also updated.

Figure 18:
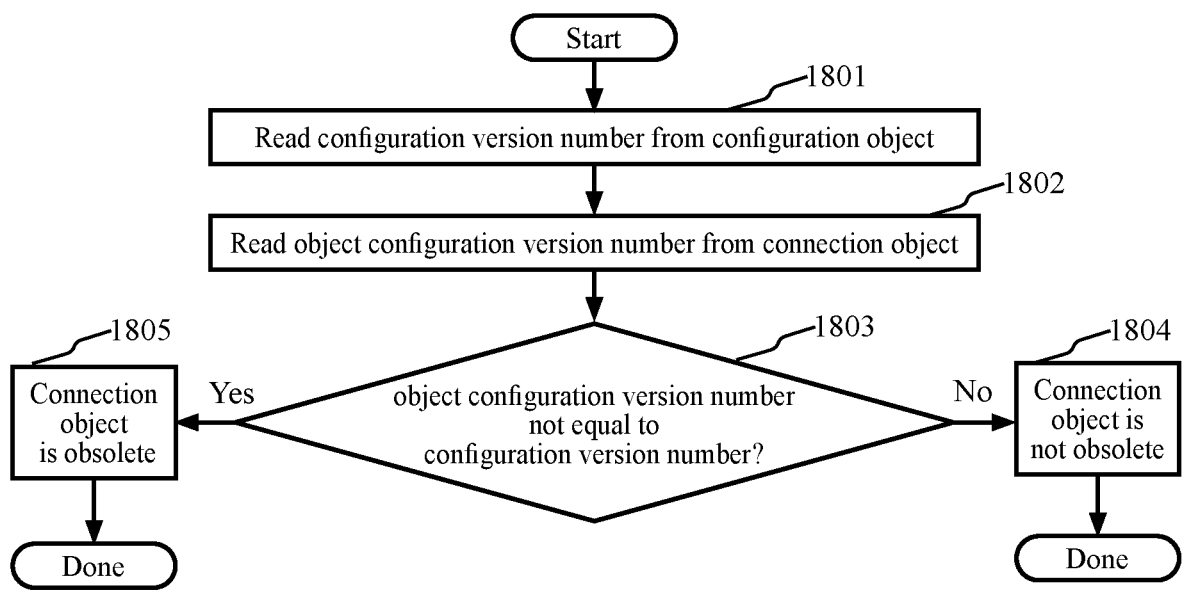
FIG. 18 is a high-level flow diagram that illustrates a process that determines whether a connection object is obsolete according to some aspects.

FIG. 18 is a high-level flow diagram that illustrates a process that determines whether a connection object is obsolete according to some aspects. At block 1801, the configuration version number of the configuration object is read. At block 1802, the object configuration version number is read. At decision block 1803, the version numbers are compared to determine if the object configuration version number is not equal to the configuration version number. If the object configuration version number is not equal to the configuration version number then at block 1805 the connection object is obsolete. If the object configuration version number is equal to the configuration version number then at block 1805 the connection object is not obsolete.

Figure 19:
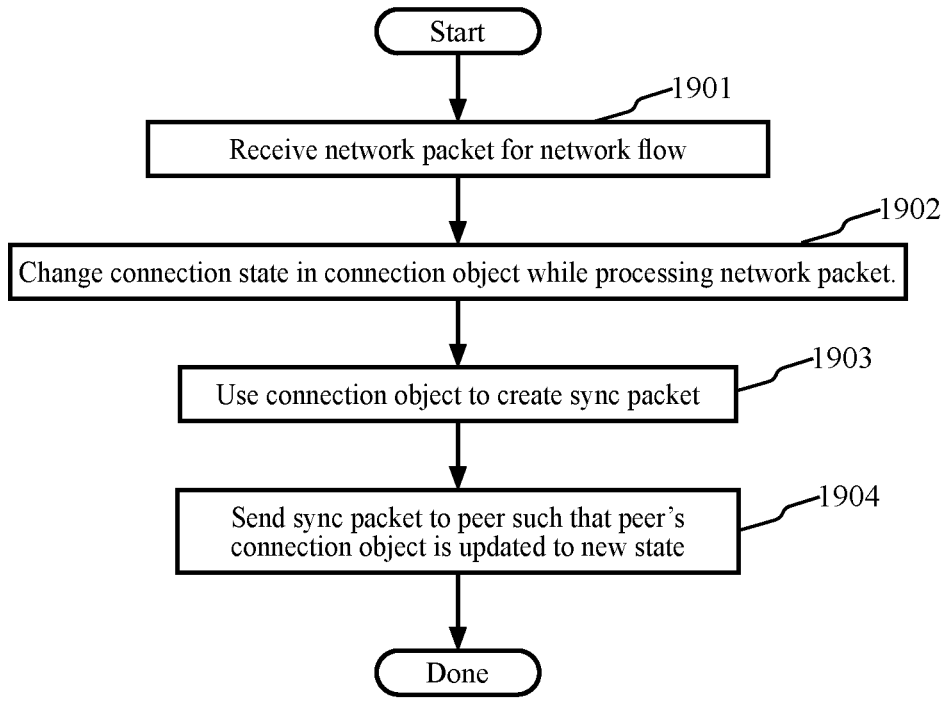
FIG. 19 is a high-level flow diagram that illustrates a process that updates a peer's connection object to a new connection state according to some aspects.

FIG. 19 is a high-level flow diagram that illustrates a process that updates a peer's connection object to a new connection state according to some aspects. After the start, at block 1901, the process can receive a network packet for a network flow. At block 1902, the process can change the connection state in the connection object while processing the network packet. At block 1903, the process can use the connection object to create a sync packet. At block 1904, the process can send the sync packet to the peer such that the peer's connection object is updated to the new state.

Figure 20:
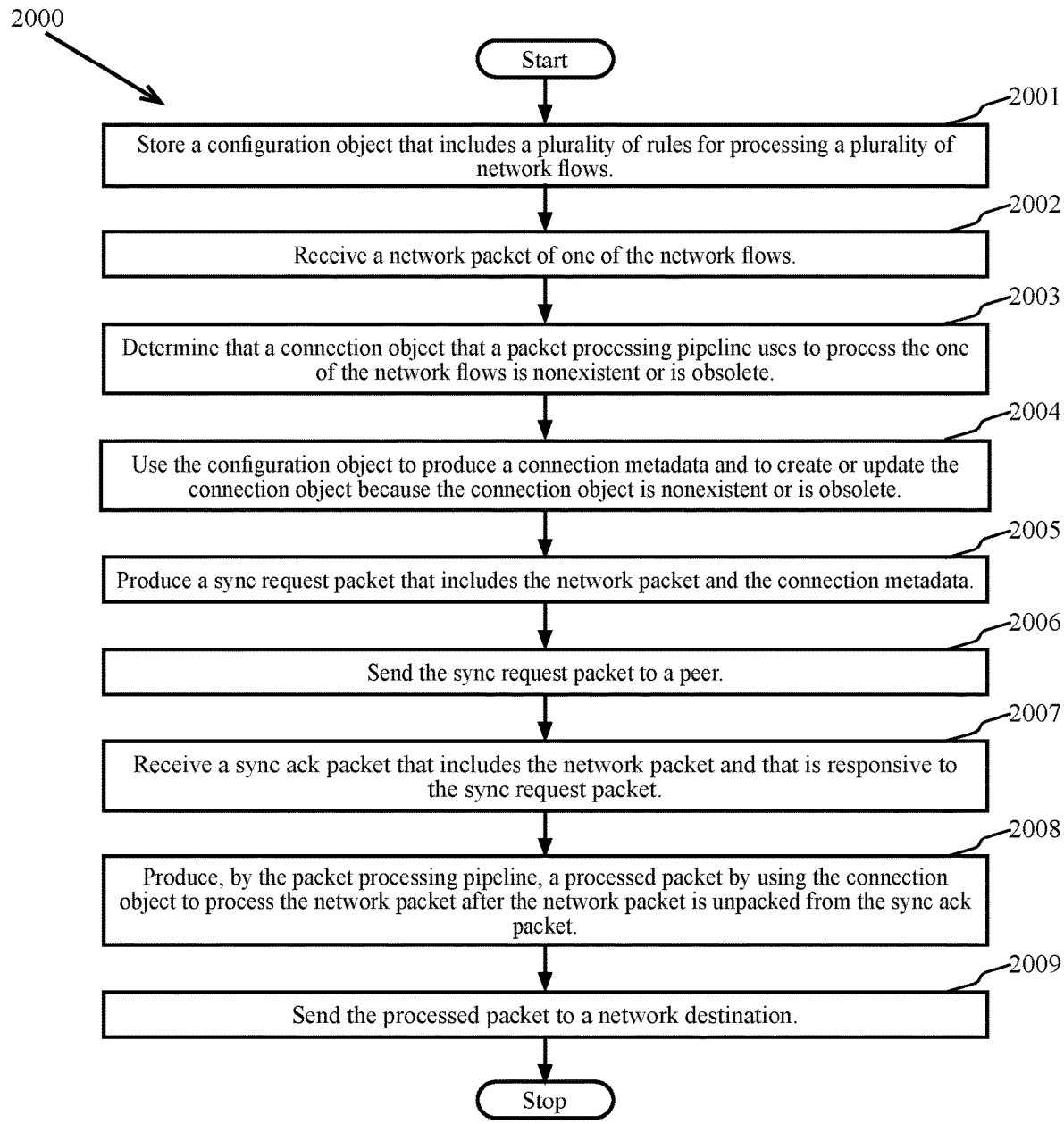
FIG. 20 is a high-level flow diagram that illustrates a method for syncing between network infrastructure devices according to some aspects.

FIG. 20 is a high-level flow diagram that illustrates a method for syncing between network infrastructure devices 2000 according to some aspects. After the start, at block 2001, the method can store a configuration object that includes a plurality of rules for processing a plurality of network flows. At block 2002, the method can receive a network packet of one of the network flows. At block 2003, the method can determine that a connection object that a packet processing pipeline uses to process the one of the network flows is nonexistent or is obsolete. At block 2004, the method can use the configuration object to produce a connection metadata and to create or update the connection object because the connection object is nonexistent or is obsolete. At block 2005, the method can produce a sync request packet that includes the network packet and the connection metadata. At block 2006, the method can send the sync request packet to a peer. At block 2007, the method can receive a sync ack packet that includes the network packet and that is responsive to the sync request packet. At block 2008, the method can produce, by the packet processing pipeline, a processed packet by using the connection object to process the network packet after the network packet is unpacked from the sync ack packet. At block 2009, the method can send the processed packet to a network destination.

Aspects described above can be ultimately implemented in a networking device that includes physical circuits that implement digital data processing, storage, and communications. The networking device can include processing circuits, ROM, RAM, TCAM, and at least one interface (interface(s)). The CPU cores described above are implemented in processing circuits and memory that is integrated into the same integrated circuit (IC) device as ASIC circuits and memory that are used to implement the programmable packet processing pipeline. For example, the CPU cores and ASIC circuits are fabricated on the same semiconductor substrate to form a System-on-Chip (SoC). The networking device may be embodied as a single IC device (e.g., fabricated on a single substrate) or the networking device may be embodied as a system that includes multiple IC devices connected by, for example, a printed circuit board (PCB). The interfaces may include network interfaces (e.g., Ethernet interfaces and/or InfiniBand interfaces) and/or PCIe interfaces. The interfaces may also include other management and control interfaces such as I2C, general purpose IOs, USB, UART, SPI, and eMMC.

Although the operations of the method(s) herein are shown and described in a particular order, the order of the operations of each method may be altered so that certain operations may be performed in an inverse order or so that certain operations may be performed, at least in part, concurrently with other operations. Instructions or sub-operations of distinct operations may be implemented in an intermittent and/or alternating manner.

It should also be noted that at least some of the operations for the methods described herein may be implemented using software instructions stored on a computer usable storage medium for execution by a computer. As an example, an embodiment of a computer program product includes a computer usable storage medium to store a computer readable program.

The computer-usable or computer-readable storage medium can be an electronic, magnetic, optical, electromagnetic, infrared, or semiconductor system (or apparatus or device). Examples of non-transitory computer-usable and computer-readable storage media include a semiconductor or solid-state memory, magnetic tape, a removable computer diskette, a random-access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A system comprising:
an ingress port that receives a network packet sent to a network destination;
a memory storing a configuration object that includes a plurality of rules for processing a plurality of network flows;
a central processing unit (CPU) that is configured to use the configuration object to create or update a connection object for processing a one of the network flows that includes the network packet; and
a packet processing pipeline circuit that is configured to use the connection object to process the network packet,
wherein a connection metadata is produced and the connection object is created or updated because the packet processing pipeline circuit determines that the connection object is nonexistent or is obsolete while processing the network packet,
wherein a sync request packet that includes the network packet and the connection metadata for the one of the network flows is generated and sent to a peer,
wherein a sync ack packet that includes the network packet and that is responsive to the sync request packet is received,
wherein the network packet is unpacked from the sync ack packet and then processed by the packet processing pipeline circuit using the connection object.

2. The system of claim 1, wherein:
the network packet has a packet header that includes a 5-tuple;
the 5-tuple indicates a source internet protocol (IP) address, a destination IP address, a source port, a destination port, and a protocol; and
the packet processing pipeline circuit uses the 5-tuple to identify the connection object.

3. The system of claim 1, wherein:
the packet processing pipeline circuit uses the connection object to process the one of the network flows; and
the packet processing pipeline circuit uses a second connection object to process a second one of the network flows.

4. The system of claim 1, wherein:
the packet processing pipeline circuit uses the connection object to process a first one of the network flows;
the packet processing pipeline circuit uses a second connection object to process a second one of the network flows;
the connection object has an object configuration version number; and
the second connection object has a different object configuration version number that is different from the object configuration version number.

5. The system of claim 1 wherein the network packet is a layer 2 packet.

6. The system of claim 1, wherein:
a second sync request packet is received from the peer;
the second sync request packet includes a second network packet and a second connection metadata for the second network packet;
the second connection metadata is used to create or update a second connection object that can be used for processing the second network packet; and
a second sync ack packet that includes the second network packet is generated and sent to the peer.

7. The system of claim 1, wherein:
a second network packet of the one of the network flows is received by the ingress port before the sync ack packet is received; and
sending the second network packet to the network destination is delayed until after the sync ack packet is received.

8. The system of claim 7, wherein the second network packet is sent to the network destination after the sync ack packet is received because the packet processing pipeline circuit determines that the connection object is nonexistent or is obsolete in the peer.

9. The system of claim 1, wherein:
a second network packet of the one of the network flows is received by the ingress port before the sync ack packet is received; and
a second sync request packet that includes the second network packet is generated and sent to the peer.

10. The system of claim 1, wherein:
the configuration object includes a configuration version number;
the connection object includes an object configuration version number; and
the connection object is obsolete because the object configuration version number is not equal to the configuration version number.

11. The system of claim 1, wherein:
the peer stores a second connection object for the network packet; and
the sync ack packet indicates an object configuration version of the second connection object.

12. The system of claim 1, wherein:
a configuration change is received; and
the connection object for the one of the network flows is obsolete because the configuration object is updated based on the configuration change.

13. The system of claim 1, wherein:
the packet processing pipeline circuit updates the connection object because the network packet indicates a connection state change; and
a second sync packet is sent to the peer because the packet processing pipeline circuit updated the connection object.

14. A method comprising:
storing a configuration object that includes a plurality of rules for processing a plurality of network flows;
receiving a network packet of one of the network flows;
determining that a connection object that a packet processing pipeline uses to process the one of the network flows is nonexistent or is obsolete;

using the configuration object to produce a connection metadata and to create or update the connection object because the connection object is nonexistent or is obsolete;

producing a sync request packet that includes the network packet and the connection metadata;

sending the sync request packet to a peer;

receiving a sync ack packet that includes the network packet and that is responsive to the sync request packet;

producing, by the packet processing pipeline, a processed packet by using the connection object to process the network packet after the network packet is unpacked from the sync ack packet; and sending the processed packet to a network destination.

15. The method of claim 14, further including:

receiving a second sync request packet that includes a second network packet and a second connection metadata for the second network packet;

using the second connection metadata to create or update a second connection object;

generating a second sync ack packet that includes the second network packet; and sending the second sync ack packet in response to the second sync request packet.

16. The method of claim 14, wherein:

a second network packet of the one of the network flows is received before the sync ack packet is received; and sending the second network packet to the network destination is delayed until after the sync ack packet is received.

17. The method of claim 14, further including:

receiving a configuration change; and updating the connection object based on the configuration change, wherein the connection object is obsolete because the configuration object is updated based on the configuration change.

18. The method of claim 14, wherein:

a match-action processing stage of a packet processing pipeline circuit updates the connection object because the network packet indicates a connection state change; and a second sync packet is sent to the peer because the packet processing pipeline circuit updated the connection object.

19. The method of claim 14, further including:

receiving, by the peer, the sync request packet;

using the connection metadata in the sync request packet to create or update a version of the connection object in the peer;

generating the sync ack packet; and sending the sync ack packet in response to the sync request packet.

20. A system comprising:

a memory configured to store a configuration object that includes rules for processing network flows;

a packet processing pipeline circuit configured to use a connection object to process a network packet of one of the network flows; and a processor configured to use the configuration object to update or create the connection object in response to receiving the network packet and determining that the connection object is nonexistent or is obsolete while processing the network packet, wherein processing the network packet includes:

receiving a sync ack packet that includes the network packet in response to sending a sync request packet to a peer, the sync request packet including the network packet and connection metadata for the one of the network flows; and using, by the packet processing pipeline circuit, the connection object to process the network packet after unpacking the network packet from the sync ack packet.

* * * * *